(12) United States Patent
Nessjoen et al.

(10) Patent No.: US 8,689,906 B2
(45) Date of Patent: Apr. 8, 2014

(54) METHODS AND APPARATUS FOR REDUCING STICK-SLIP

(75) Inventors: Pal Jacob Nessjoen, Trondheim (NO); Age Kyllingstad, Algard (NO)

(73) Assignee: National Oilwell Varco, L.P., Houston, TX (US)

( * ) Notice: Subject to any disclaimer, the term of this patent is extended or adjusted under 35 U.S.C. 154(b) by 296 days.

(21) Appl. No.: 13/132,559

(22) PCT Filed: Nov. 30, 2009

(86) PCT No.: PCT/GB2009/051618
§ 371 (c)(1),
(2), (4) Date: Jun. 2, 2011

(87) PCT Pub. No.: WO2010/064031
PCT Pub. Date: Jun. 10, 2010

(65) Prior Publication Data
US 2011/0245980 A1  Oct. 6, 2011

(30) Foreign Application Priority Data

Dec. 2, 2008 (WO) ................ PCT/GB2008/051144
May 7, 2009 (GB) ................... 0907760.3

(51) Int. Cl.
*E21B 19/00* (2006.01)
*E21B 21/00* (2006.01)
*E21B 44/00* (2006.01)
*G05B 11/01* (2006.01)
*G01V 3/00* (2006.01)

(52) U.S. Cl.
USPC ................ 175/322; 175/24; 175/25; 175/26; 175/73; 175/74; 340/853.1; 700/19; 700/20

(58) Field of Classification Search
USPC .............. 700/19–20, 280; 175/24–26, 73–74, 175/322; 340/853.1; 717/168
See application file for complete search history.

(56) References Cited

U.S. PATENT DOCUMENTS

| 5,507,353 A | 4/1996 | Pavone |
| 6,166,654 A | 12/2000 | Van Den Steen |
| 6,206,108 B1 * | 3/2001 | MacDonald et al. ........... 175/24 |

(Continued)

FOREIGN PATENT DOCUMENTS

JP  11332272 A  11/1999

OTHER PUBLICATIONS

N. Challamel et al.; "A Stick-slip Analysis Based on Rock/Bit Interaction: Theoretical and Experimental Contribution"; 2000 IADC/SPE Drilling Conference; Feb. 23-25, 2000; pp. 1-10; IADC/SPE 59230; Society of Petroleum Engineers, Inc.; New Orleans, Louisiana, U.S.A.

(Continued)

*Primary Examiner* — Ramesh Patel
(74) *Attorney, Agent, or Firm* — Conley Rose, P.C.

(57) ABSTRACT

A method and apparatus for estimating the instantaneous rotational speed of a bottom hole assembly at the lower end of a drill string. In one embodiment, a method includes driving the drill string by a drilling mechanism at the upper end of the drill string. A fundamental frequency of stick-slip oscillations suffered by the drill string is estimated. Variations in a drive torque of the drilling mechanism are determined. Known torsional compliance of the drill string is combined with the variations in the drive torque. An output signal representing the instantaneous rotational speed is provided.

20 Claims, 12 Drawing Sheets

(56) References Cited

U.S. PATENT DOCUMENTS

| | | | | |
|---|---|---|---|---|
| 7,518,950 | B2* | 4/2009 | Treviranus et al. | 367/83 |
| 7,983,113 | B2* | 7/2011 | Krueger et al. | 367/83 |
| 8,322,461 | B2* | 12/2012 | Hay et al. | 175/45 |
| 2004/0112640 | A1* | 6/2004 | Hay et al. | 175/26 |
| 2006/0225920 | A1* | 10/2006 | Treviranus et al. | 175/40 |
| 2008/0007423 | A1* | 1/2008 | Krueger et al. | 340/854.5 |
| 2009/0120689 | A1* | 5/2009 | Zaeper et al. | 175/40 |
| 2010/0108383 | A1* | 5/2010 | Hay et al. | 175/26 |
| 2011/0120775 | A1* | 5/2011 | Krueger et al. | 175/73 |
| 2011/0186353 | A1* | 8/2011 | Turner et al. | 175/40 |
| 2011/0232966 | A1* | 9/2011 | Kyllingstad | 175/24 |
| 2012/0130693 | A1* | 5/2012 | Ertas et al. | 703/2 |

OTHER PUBLICATIONS

Pavone, D.R. et al., "Application of High Sampling Rate Downhole Measurements for Analysis and Cure of Stick-Slip in Drilling," Society of Petroleum Engineers, SPE 28324, Sep. 25, 1994, pp. 335-345.

Halsey, G.W. et al., "Torque Feeback Used to Cure Slip-Stick Motion," Society of Petroleum Engineers, SPE 18049, Oct. 2, 1988, pp. 277-282.

Jansen, J.D. et al, "Active Damping of Self-Excited Torsional Vibrations in Oil Well Drillstrings," Journal of Sound and Vibration, vol. 179, No. 4, Jan. 26, 1995, pp. 647-668.

Search Report for GB0907760.3 dated Oct. 1, 2009, 3 pages.

Search Report and Written Opinion for PCT/GB2009/051618 dated Nov. 30, 2009, 12 pages.

International Search Report for PCT/GB2008/05144, dated Jul. 20, 2009, 5 pages.

Tucker, Robin et al., "Torsional Vibration Control and Cosserat Dynamics of a Drill-Rig Assembly;" Meccanica, vol. 38: 143-159, 2003.

Tucker, Robin et al., "Torsional Vibration Control and Cosserat Dynamics of a Drill-Rig Assembly;" Meccanica, vol. 38: 143-159, 2003—Annotated.

Abdulgalil, F. et al., "Nonlinear Friction Compensation Design for Suppressing Stick Slip Oscillations in Oil Well Drillstrings;" Control Conference, vol. 2, Aug. 2004.

Halsey, G.W. et al., "Torque Feedback Used to Cure Slip-Stick Motion;" SPE International Oil and Gas Conference and Exhibition, vol. 18049, Oct. 2, 1988.

European Patent Office Communication of Notice of Opposition dated Oct. 14, 2013, against European Patent No. EP2364397; titled "Method and Apparatus for Reducing Stick-Slip;" Proprietor National Oilwell Varco, L.P., by Opponent, Cofely Experts B.V., Amsterdam, The Netherlands.

* cited by examiner

Configuration | Trend

Stick Slip indicator
○ ... > 70%
○ ... 30-70%
○ ... < 30%

○ Soft Speed On
○ Soft Speed Inhibited
○ Drill Torque Limit too Low

| | String Sel. |
|---|---|
| | ☑ |
| | ☑ |
| Stick Slip Periode, in use       5.2 s | ☑ |
| Stick Slip Periode, from PLC Analyzer  5.2 s | ☑ |
| S  Stick Slip Periode, manual setting  5.3 s | ☐ |
| C  Copy Theoretical Stick Slip Periode | ☐ |
| | ☐ |

☐ Use Bit Depth from SDI         3191.3 m

[+]
[−]  Prevention Factor           15.0 %

| Description | Length m | Body OD mm | Body ID mm |
|---|---|---|---|
| Lower BHA | 100.0 | 203.2 | 63.5 |
| HWDP | 0.0 | 127.0 | 76.2 |
| Drill Pipe 1 | 800.0 | 127.0 | 108.6 |
| Drill Pipe 2 | 2300.0 | 139.7 | 121.4 |
| Drill Pipe 3 | | | |
| Drill Pipe 4 | | | |
| Drill Pipe 5 | | | |
| Drill Pipe 6 | | | |

Total String Length      3200.0 m
Effective Outer Diameter      135.0 mm
Stick Slip Periode, Theoretical      5.2 s

[ Calculate New Values ]

Stick Slip Periode Calculated Last Time: 25.04.2007 17:41:23
Calculation Result Out of Range FIG. 4B¹
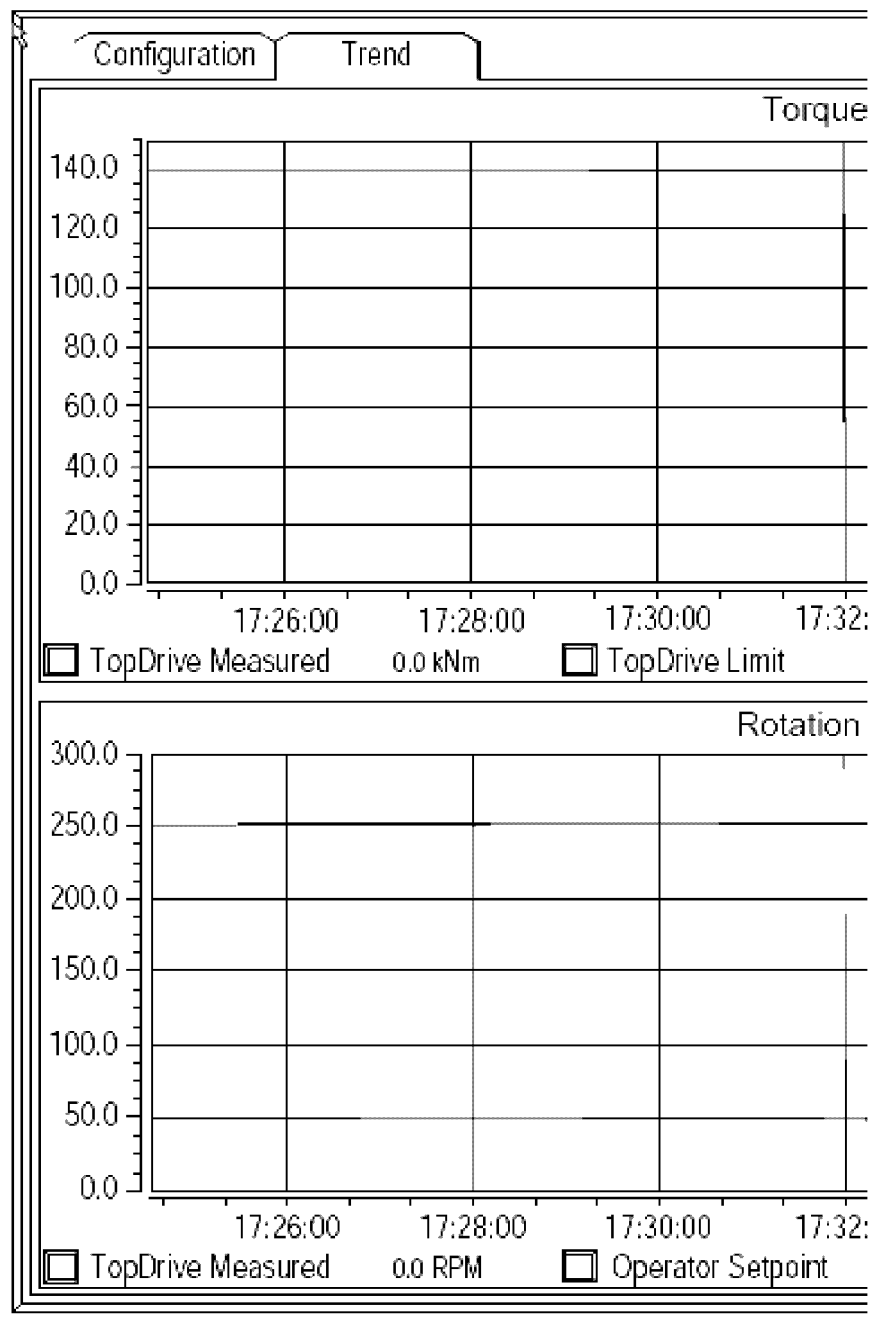

METHODS AND APPARATUS FOR REDUCING STICK-SLIP

CROSS REFERENCE TO RELATED APPLICATIONS

This application claims priority from PCT patent application number PCT/GB2008/051144, filed 2 Dec. 2008, UK patent application number 0907760.3, filed 7 May 2009, and PCT patent application number PCT/GB2009/051618 filed 30 Nov. 2009. The disclosure of each of those applications is hereby incorporated by reference in its entirety where appropriate for teachings of additional or alternative details, features, and/or technical background, and priority is asserted.

FIELD OF THE INVENTION

The present invention relates to a method of damping stick-slip oscillations in a drill string, to a method of drilling a borehole, to a method of estimating the instantaneous rotational speed of a bottom hole assembly, to a drilling mechanism for use in drilling a borehole, to an electronic controller for use with a drilling mechanism, and to a method of upgrading a drilling mechanism on a drilling rig.

BACKGROUND

Drilling an oil and/or gas well involves creation of a borehole of considerable length, often up to several kilometers vertically and/or horizontally by the time production begins. A drill string comprises a drill bit at its lower end and lengths of drill pipe that are screwed together. The whole drill string is turned by a drilling mechanism at the surface, which in turn rotates the bit to extend the borehole. The drilling mechanism is typically a top drive or rotary table, each of which is essentially a heavy flywheel connected to the top of the drill string.

The drill string is an extremely slender structure relative to the length of the borehole, and during drilling the string is twisted several turns because of torque-on-bit between about 500 and 10,000 Nm. The drill string also displays a complicated dynamic behaviour comprising axial, lateral and torsional vibrations. Simultaneous measurements of drilling rotation at the surface and at the bit have revealed that the drill string often behaves as a torsional pendulum i.e. the top of the drill string rotates with a constant angular velocity, whereas the drill bit performs a rotation with varying angular velocity comprising a constant part and a superimposed torsional vibration. In extreme cases, the torsional part becomes so large that the bit periodically comes to a complete standstill, during which the drill string is torqued-up until the bit suddenly rotates again at an angular velocity that is much higher than the angular velocity measured at the surface. This phenomenon is known as stick-slip.

Stick-slip has been studied for more than two decades and it is recognized as a major source of problems, such as excessive bit wear, premature tool failures and poor drilling rate. One reason for this is the high peak speeds occurring during in the slip phase. The high rotation speeds in turn lead to secondary effects like extreme axial and lateral accelerations and forces.

A large number of papers and articles have addressed the stick-slip problem. Many papers focus on detecting stick-slip motion and on controlling the oscillations by operational means, such as adding friction reducers to the mud, changing the rotation speed or the weight on bit. Even though these remedies sometimes help, they are either insufficient or they represent a high extra costs.

A few papers also recommend applying smart control of the top drive to dampen and prevent stick-slip oscillations. In IADC/SPE 18049 it was demonstrated that torque feed-back from a dedicated string torque sensor could effectively cure stick-slip oscillations by adjusting the speed in response to the measured torque variations. In Jansen J. D. et al. "Active Damping of Self-Excited Torsional Vibrations in Oil Well Drill strings", 1995, Journal of Sound and Vibrations, 179(4), 647-668, it was suggested that the drawback of this approach is the need for a new and direct measurement of the string torque, which is not already available. U.S. Pat. No. 5,117,926 disclosed that measurement as another type of feedback, based on the motor current (torque) and the speed. This system has been commercially available for many years under the trade mark SOFT TORQUE®. The main disadvantage of this system is that it is a cascade control system using a torque feedback in series with the stiff speed controller. This increases the risk of instabilities at frequencies higher than the stick-slip frequency.

IADC/SPE 28324 entitled "Application of High Sampling Rate Downhole Measurements for Analysis and Cure of Stick-Slip in Drilling" discloses control of a drilling process using driving equipment that includes a PID, a motor, a gear box and rotary table. The PID tries to maintain the desired rotary speed of the drill string and it is suggested that the PID can be adjusted to prevent stick-slip. However, a simulation result shows poor damping of stick-slip oscillations and it is concluded in the paper that PID is too simple a servo-control system to prevent stick-slip.

Our co-pending patent application PCT/GB2008/051144 discloses a method for damping stick-slip oscillations, the maximum damping taking place at or near a first or fundamental (i.e. lowest frequency) stick-slip oscillation mode. In developing the method we have identified a further problem to be addressed when the drill string is extremely long (greater than about 5 km) and the fundamental stick-slip period exceeds about 5 or 6 s. Even though the method of our previous patent application is able to cure the fundamental stick-slip oscillation mode in such strings, as soon as these oscillations are dampened, the second natural mode tends to become unstable and grow in amplitude until full stick-slip is developed at the higher frequency. In certain simulations we have found that this second mode has a natural frequency which is approximately three times higher than the fundamental stick-slip frequency. The higher order stick-slip oscillations are characterised by short period and large amplitude cyclic variations of the drive torque. Simulations show that the bit rotation speed also in this case varies between zero and peak speeds exceeding twice the mean speed.

We have also found through other simulations that the method employed by the aforementioned SOFT TORQUE® system suffers from the same problem. Neither method is able to inhibit both the first and second mode stick-slip oscillations.

SUMMARY

Embodiments of the present disclosure are based on the insight that a PI or PID controller can in fact be used to obtain significant damping of stick-slip oscillations by the drilling mechanism. In particular we have realised that a PI or PID controller can be tuned to ensure efficient damping torsional wave energy at and/or near the fundamental mode of stick-slip frequency. A further insight on which certain embodiments are based is that both the fundamental and one or more higher mode (e.g. second natural mode and greater) oscillation can also be damped by reducing the effective inertia of the drilling mechanism, which may be achieved in several different ways. One way is by further adjustment of the PI or PID controller. Another way is by changing the drilling mechanism to a higher gear. In some embodiments the fundamental and one or more higher mode may be damped selectively either by a computer decision in advance (e.g. using predictions based on string geometry). In other embodiments the damping may be selectively activated by monitoring the period of the fundamental mode and applying the method when the period of the fundamental exceeds a certain threshold.

In contrast to some earlier systems, various embodiments disclosed herein are passive in the sense that neither string torque nor drive torque is needed in a feed-back loop. Accordingly, damping can be achieved without the need for additional sensors to measure string torque, that otherwise increases complexity and cost.

Some embodiments of the invention are based upon the insight that it is possible to estimate the instantaneous rotational speed of the bit (ignoring any contribution from an optional mud motor) and to make this information available to other control processes on the rig and/or to the driller via a console. By repeating the method, a substantially real-time estimation of bit speed can be provided. Provision of this data may help a driller and/or other automated drilling control process determine whether the PI tuning disclosed herein would improve drilling performance e.g. by reducing stick-slip.

According to some embodiments of the invention there is provided a method of damping stick-slip oscillations in a drill string, which method comprises the steps of:

(a) damping said stick-slip oscillations using a drilling mechanism at the top of said drill string; and (b) controlling the speed of rotation of said drilling mechanism using a PI controller;

characterised by the step of (c) tuning said PI controller so that said drilling mechanism absorbs most torsional energy from said drill string at a frequency that is at or near a frequency of said stick-slip oscillations, and/or at or near a fundamental frequency and at least one higher frequency mode of said stick-slip oscillations. The drilling mechanism may comprise a top drive or a rotary table for example. It is to be noted that the PI controller may be tuned once (for example upon encountering stick-slip for the first time, or in advance of drilling) and upon subsequent occurrences of stick-slip the PI controller may be used again without being re-tuned. Another possibility is for the PI controller to be re-tuned each time stick-slip is encountered, or even periodically during a stick-slip phase of drilling. In one embodiment, the PI controller is tuned before it is used to control the drilling mechanism to damp stick-slip oscillations. For example, the controller may be tuned upon encountering stick-slip oscillations or it may be performed periodically during drilling of the borehole as the drill string length increases. One possibility is for the tuning to take place as each 30 m section of drill pipe is added to the drill string.

In certain embodiments, the PI controller may adjusted to damp both a fundamental frequency and one or more higher mode stick-slip oscillations; the options for such tuning include: tuning in advance of drilling (for example on the basis of predictions using string geometry, or simply as a precaution against higher mode oscillations whether they are expected or not), tuning on encountering a fundamental mode (whether or not higher modes are expected) or tuning on encountering higher mode stick-slip oscillations.

In some embodiments said stick-slip oscillations comprise torsional waves propagating along said drill string, and step (c) comprises adjusting an I-term of said PI controller to be dependent on an approximate period of said fundamental frequency of said stick slip oscillations and on an effective inertia of said drilling mechanism, whereby said drilling mechanism has a frequency dependent reflection coefficient of said torsional waves, which reflection coefficient is substantially at a minimum at or near said fundamental frequency of stick-slip oscillations. It is to be noted that it is not essential for the peak absorption frequency of the drilling mechanism to match exactly the fundamental frequency of the stick-slip oscillations. Due to the way the PI controller is tuned, the drilling mechanism has a bandwidth of frequency absorption that is of a sufficient width (e.g. ~0.4 Hz) and magnitude (e.g. less than 85% reflection) so that damping is still effective even if the two frequencies are not exactly matched. This represents a significant advantage of the method. Typically, the fundamental frequency of stick-slip oscillations encountered in practice lies in the range 0.1 Hz (period 10 s) to 0.5 Hz (period 2 s) and the peak absorption frequency caused by the PI controller may be within 50% of the fundamental frequency.

In some embodiments the lowest point of the frequency-reflection coefficient curve has a value between about 50% (0.5) and 90% (0.9). It has been found that reflection coefficients any higher than about 90% can make the drilling mechanism too "stiff" and reduce the chance of successfully damping the stick-slip oscillations. On the other hand, it has been found that a reflection coefficient of any lower than about 50% makes the drilling mechanism too "soft" and drilling performance can be impaired since the drilling mechanism responds to much smaller changes in drill string torque resulting in high speed variations.

The absorption bandwidth is inversely proportional to the effective inertia J of the drilling mechanism. Therefore as the effective inertia of a drilling mechanism increases, it is preferable although not essential, that the approximate stick-slip period is estimated or measured more accurately to ensure that the frequency of greatest damping is real stick-slip frequency.

In some embodiments, the method further comprises the step of adjusting said I-term according to $I=\omega_s^2 J$ where $\omega_s$ is an approximate or estimated angular frequency of said stick-slip oscillations and J is the effective inertia of said drilling mechanism. $\omega_s$ could of course be expressed in terms of other parameters in this formula, such as the period or frequency.

In certain embodiments, said effective inertia comprises the total mechanical inertia of said drilling mechanism at an output shaft thereof. This has been found useful for damping predominantly only a fundamental mode of stick-slip oscillation, although higher modes are damped to some extent.

In other embodiments, the method further comprises the step of reducing an effective inertia of said drilling mechanism, whereby a damping effect of said drilling mechanism is increased for frequencies above said fundamental frequency. This is a significant optional step of the method that enables one or more higher mode oscillations to be damped (and in some embodiments cured altogether) at the same time as damping the fundamental mode. This possibility is particularly important for long drill strings (typically over about 5 km in length), where higher mode oscillations are likely to be problematic. Reduction of effective inertia may be applied continuously (whether or not higher mode stick-slip is expected) or selectively either upon detection of a fundamental mode of period greater than a certain threshold (e.g. five seconds), or in response to detection of one or more higher mode whilst drilling. Furthermore, the quantity of inertia reduction may be adjusted to change the amount of damping at higher frequencies.

In some embodiments the step of reducing said effective inertia comprises the step of tuning said PI controller with an additional torque term that is proportional to the angular acceleration of said drilling mechanism. Since the angular acceleration is readily derived from the angular speed of the drilling mechanism, this makes the method very easy to implement in a computer operated speed controller (for example a controller implemented in a PLC).

In certain aspects, the method further comprises the step of multiplying said angular acceleration by a compensation inertia ($J_c$), which compensation inertia ($J_c$) is adjustable so as to control the amount of the reduction of the effective inertia of said drilling mechanism. The compensation inertia may be a relatively static value (e.g. set by a driller via a console) or a dynamic value (e.g. adjusted in real time according to drilling conditions). Typically the compensation inertia ($J_c$) may be adjusted so as to reduce said effective inertia by between 0 and 80%.

In some embodiments, the method further comprises the step of adjusting said I-term of said PI controller according to $I=\omega_s^2 J$, where $\omega_s$ is an approximate or estimated angular frequency of said stick-slip oscillations and J is the reduced effective inertia value of said drilling mechanism.

In certain embodiments, said drilling mechanism has a torsional energy absorption bandwidth for stick-slip oscillations, the size of said bandwidth obtainable from its full width half maximum, whereby upon reducing the effective inertia of said drilling mechanism the size of said full width half maximum (FWHM) is greater. Use of the FWHM provides a convenient way to compare different absorption bandwidths.

In some embodiments said drilling mechanism has a frequency dependent damping curve having a point of maximum damping, the method further comprising the step of shifting said point of maximum damping to higher frequencies whereby the damping effect of said drilling mechanism on at least some higher frequencies is increased and damping of said fundamental frequency is reduced. This is referred to herein as de-tuning, and optionally, is performed if higher mode stick-slip oscillations are not reduced or cured by the inertia compensation method.

In some aspects, said step of shifting comprises determining an I-term of said PI controller as $I=\omega_s^2 J$, in which a period value $\omega_s$ is greater than said approximate period of said fundamental frequency, whereby said frequency dependent damping curve is shifted toward higher frequencies and damping of at least one higher mode of oscillation is increased above the amount of damping obtainable when using said approximate period to determine said I-term. The period value may be 40% greater than said approximate period.

In some embodiments, the method further comprises the step of further reducing said effective inertia of said drilling mechanism when performing said shifting step, whereby narrowing of an absorption bandwidth of said damping curve is inhibited. In certain aspects this may be achieved by reducing said effective inertia and increasing said period value by the same factor.

In other embodiments, the step of reducing said effective inertia comprises changing into a higher gear of said drilling mechanism. Instead of achieving an effective inertia reduction through a speed controller, a similar effect may be achieved by changing into a higher gear (assuming the drilling mechanism has more than one gear). In this way it is envisaged that the PI controller could be tuned to damp predominantly the fundamental stick-slip frequency and, if and when one or more higher mode oscillation is encountered, the drilling mechanism may be shifted into a higher gear to increase damping at higher frequencies.

In other embodiments, the method further comprises the steps of monitoring said drilling mechanism for occurrence of one or more higher mode of oscillation, and when detected, performing any of the higher mode damping steps set out above in order to damp said one or more higher mode of oscillation. The monitoring may be performed by computer observation of the speed of rotation of the drilling mechanism for example.

In other aspects the method further comprises the steps of monitoring a period of said fundamental frequency, comparing said period against a period threshold and, if said period exceeds said period threshold, performing any of the higher mode damping steps set out above to damp said one or more higher mode of oscillation. One example of the period threshold is five seconds. Once the fundamental stick slip period increases beyond that, the effective inertia is reduced to counter-act any higher mode oscillations. In some embodiments, above said period threshold, said effective inertia is reduced as said period increases. For example, the effective inertia may be reduced as a function of the monitored period. In one particular example, the effective inertia is reduced linearly from 100% to 25% of its full value as the monitored period increases between about five seconds and eight seconds.

In some embodiments, the PI controller may comprise a PID controller in which the derivative term is not used in implementation of effective inertia reduction. For example a standard digital PID controller may be adapted (e.g. by adjustment of low-level source code) to implement effective inertia reduction.

In other embodiments, the method further comprises the step of measuring said approximate period of stick-slip oscillations for use in adjusting said I-term. In certain embodiments this measurement may be performed automatically by a PLC for example. In that case, the approximate period may be determined using drill string geometry or it may be determined by computer observation of drive torque. Another possibility is for the approximate period to be estimated by the driller, for example by timing with a stop-watch torque oscillations shown on the driller's console, or by simply listening to changes in pitch of the motor(s) of the drilling mechanism and timing the period that way. The driller may input the approximate stick-slip period into a console to be processed by a PLC to tune the I-term of the PI controller.

In some embodiments, the method further comprises the step of adjusting a P-term of said PI controller to be the same order of magnitude as the characteristic impedance $\zeta$ of said drill string. In this way the reflection coefficient of the drilling mechanism can be reduced further, increasing the damping effect.

In other embodiments, the method further comprises the step of adjusting said P-term such that said reflection coefficient does not vanish completely whereby a fundamental mode of said stick slip oscillations is inhibited from splitting into two new modes with different frequencies.

In some embodiments, the method further comprises the step of adjusting said P-term as $P=\zeta/a$ where a is a mobility factor that permits adjustment of said P-term during drilling, whereby energy absorption of said stick-slip oscillations by said drilling mechanism may be increased or reduced. The mobility factor may be adjusted automatically by a controller (e.g. PLC) and/or may be adjusted manually by the driller. In this way the softness of the drilling mechanism can be adjusted to achieve a balance between damping stick-slip oscillations and drilling performance.

In some aspects the method further comprises the step of increasing said mobility factor if the magnitude of said stick-slip oscillations do not substantially disappear or reduce. In this way the softness of the drilling mechanism is increased (i.e. is made more responsive to smaller torque variations).

In other aspects the method further comprises the step of reducing said mobility factor once the magnitude of said stick-slip oscillations has substantially disappeared or reduced, whereby drilling efficiency is increased without re-appearance or increase in magnitude of said stick-slip oscillations. In this way the softness of the drilling mechanism is reduced (i.e. is made less responsive to smaller torque variations).

In some embodiments, said PI controller is separate from a drilling mechanism speed controller, the method further comprising the step of bypassing said drilling mechanism speed controller with said PI controller during damping of said stick-slip oscillations. The PI controller may be provided on a drilling rig separate from the drilling mechanism, either on a new rig or as an upgrade to an existing rig in the field. In use, when stick-slip oscillations occur, the PLC may override the dedicated speed controller of the drilling mechanism (either automatically or under control of the driller) to control it as set out above.

In other embodiments, said drilling mechanism comprises said PI controller, the method further comprising the steps of tuning said PI controller when said stick-slip oscillations occur, and leaving said PI controller untuned otherwise. In such embodiments the PI controller may be part of the dedicated speed controller in a drilling mechanism such as a top drive. The PI controller may be provided as software installed on a PLC or other computer control mechanism at point of manufacture. In use, the PI controller is used continuously but may only need to be tuned as described above when stick-slip oscillations occur. This tuning may be activated automatically be remote drilling control software (e.g. a driller's console on or off site) and/or may be controlled by the driller using a driller's console.

In some embodiments, the method further comprises the step of estimating the instantaneous rotational speed of a bottom hole assembly at the lower end of said drill string by combining a known torsional compliance of said drill string with variations in a drive torque of said drilling mechanism. This is a particularly useful optional feature of some embodiments of the invention and the output may be displayed on a driller's console or otherwise to help the driller to visualise what is happening downhole.

In other embodiments, variations in drive torque are expressed only at a fundamental frequency of said stick-slip oscillations, whereby said estimating step is simplified such that it may be implemented by a PLC and performed in real time. The drive torque variations comprise a frequency spectrum which makes the drive torque signal difficult to analyse. We have realised that it is sufficient only to analyse the fundamental frequency component of the drive torque variations and that this enables the analysis to be performed in real-time on a PLC for example.

In some embodiments, said estimating step comprises band pass filtering a drive torque signal with a band pass filter centred on an approximate frequency of said stick-slip oscillations. This helps to remove most of the higher and lower frequencies in the torque signal. The approximate frequency may be determined as described above.

In certain aspects, said estimate of instantaneous rotational speed comprises determining a downhole speed using a total static drill string compliance and a phase parameter, and determining the sum of (i) a low pass filtered signal representing a speed of rotation of said drilling mechanism and (ii) said downhole speed.

In other embodiments, the method further comprises the step of determining said estimate periodically and outputting said estimate on a driller's console whereby a driller is provided with a substantially real-time estimate of the instantaneous rotational speed of said bottom hole assembly.

In some embodiments, the method further comprises the step of determining a stick-slip severity as the ratio of dynamic downhole speed amplitude over the mean rotational speed of said drilling mechanism, which stick-slip severity is useable to provide an output signal indicating the severity of stick-slip at that point in time.

According to some embodiments of the invention there is provided a method of drilling a borehole, which method comprises the steps of:

(a) rotating a drill string with a drilling mechanism so as to rotate a drill bit at a lower end of said drill string whereby the earth's surface is penetrated; and (b) in response to detection of stick-slip oscillations of said drill string using a PI controller to control said drilling mechanism, which PI controller has been tuned by a method disclosed herein. It is to be noted that the PI controller may be tuned once (for example upon encountering stick-slip for the first time) and upon subsequent occurrences of stick-slip the PI controller may be used without re-tuning. Of course, another possibility is for the PI controller to be re-tuned each time stick-slip is encountered, or even as stick-slip is ongoing. The PI tuning method may therefore be used selectively during drilling to counter stick-slip oscillations. At other times the PI controller may be left untuned so that a speed controller of the drilling mechanism has a standard stiff behaviour (i.e. with a reflection coefficient approximately equal to 1).

According to yet another embodiment of the invention there is provided a method of estimating the instantaneous rotational speed of a bottom hole assembly at the lower end of a drill string, which method comprises the steps of combining a known torsional compliance of said drill string with variations in a drive torque of said drilling mechanism. Such a method may be performed either on or off site, either during drilling or after drilling a section of the borehole. Such a method provides a drilling analysis tool to determine if the PI controller tuning aspect of embodiments of the invention would improve drilling performance. Accordingly, software to perform this method may be provided separately from software to perform the tuning method. The rotational speed estimating software may be provided in the controller of a new drilling mechanism (i.e. included a point of manufacture), as an upgrade to an existing drilling mechanism (e.g. performed either on site or remotely using a satellite connection to a computer system on the drilling rig), or as a computer program product (e.g. on a CD-ROM or as a download from a website) for installation by the rig operator.

In certain aspects, the rotational speed estimating method further comprises the estimating steps as set out above.

According to some embodiments of the invention there is provided a drilling mechanism for use in drilling a borehole, which drilling mechanism comprises an electronic controller having a PI controller and memory storing computer executable instructions that when executed cause said electronic controller to tune said PI controller according to the tuning steps set out above.

According to other embodiments of the invention there is provided an electronic controller for use with a drilling mechanism for drilling a borehole, which electronic controller comprises a PI controller and memory storing computer executable instructions that when executed cause said electronic controller to tune said PI controller according to the tuning steps set out above. Such an electronic controller is useful for upgrading existing drilling rigs or where it is desirable or necessary that the electronic controller is separate from the drilling mechanism.

According to further embodiments of the invention there is provided a method of upgrading a drilling mechanism on a drilling rig, which method comprises the steps of uploading computer executable instructions to an electronic controller on said drilling rig, which electronic controller is for controlling operation of said drilling mechanism, wherein said computer executable instructions comprise instructions for performing a tuning method as set out above. Such an upgrade may be performed on site, or may be performed remotely using a satellite connection for example.

According to certain embodiments of the invention there is provided a method of damping stick-slip oscillations in a drill string, which method comprises the steps of:

(a) damping said stick-slip oscillations using a drilling mechanism at the top of said drill string; and (b) controlling the speed of rotation of said drilling mechanism using a PI controller;

characterised by the step of (c) reducing an effective inertia of said drilling mechanism whereby both a fundamental frequency and at least one higher frequency mode (harmonic) of stick-slip oscillation are damped at the same time. The effective inertia may be reduced by tuning said PI controller (which includes a PID controller) and/or by changing said drilling mechanism to a higher gear.

Certain embodiments of this invention are not limited to any particular individual feature disclosed here, but include combinations of them distinguished from the prior art in their structures, functions, and/or results achieved. Features of various embodiments of the invention have been broadly described so that the detailed descriptions that follow may be better understood, and in order that the contributions of this invention to the arts may be better appreciated. There are, of course, additional aspects of the various embodiments of the invention described below and which may be included in the subject matter of the claims. Those skilled in the art who have the benefit of this disclosure, its teachings, and suggestions will appreciate that the conceptions of this disclosure may be used as a creative basis for designing other structures, methods and systems for carrying out and practicing the present invention. The claims of this disclosure are to be read to include any legally equivalent devices or methods which do not depart from the spirit and scope of the embodiments disclosed herein.

The present disclosure recognizes and addresses the previously mentioned problems and long felt needs and provides a solution to those problems and a satisfactory meeting of those needs in its various possible embodiments and equivalents thereof. To one of skill in this art who has the benefits of this disclosure's realizations, teachings, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later disguise it by variations in form, changes, or additions of further improvements.

It will be understood that the various embodiments of the present invention may include one, some, or all of the disclosed, described, and/or enumerated improvements and/or technical advantages and/or elements in the claims.

BRIEF DESCRIPTION OF THE FIGURES

For a better understanding of exemplary embodiments of the invention, reference will now be made, by way of example only, to the accompanying drawings in which:

FIGS. 4A' and 4A" is a screenshot of a first window available on a driller's console for configuring and controlling a method according to various embodiments of the present invention;

DETAILED DESCRIPTION

Figure 1:
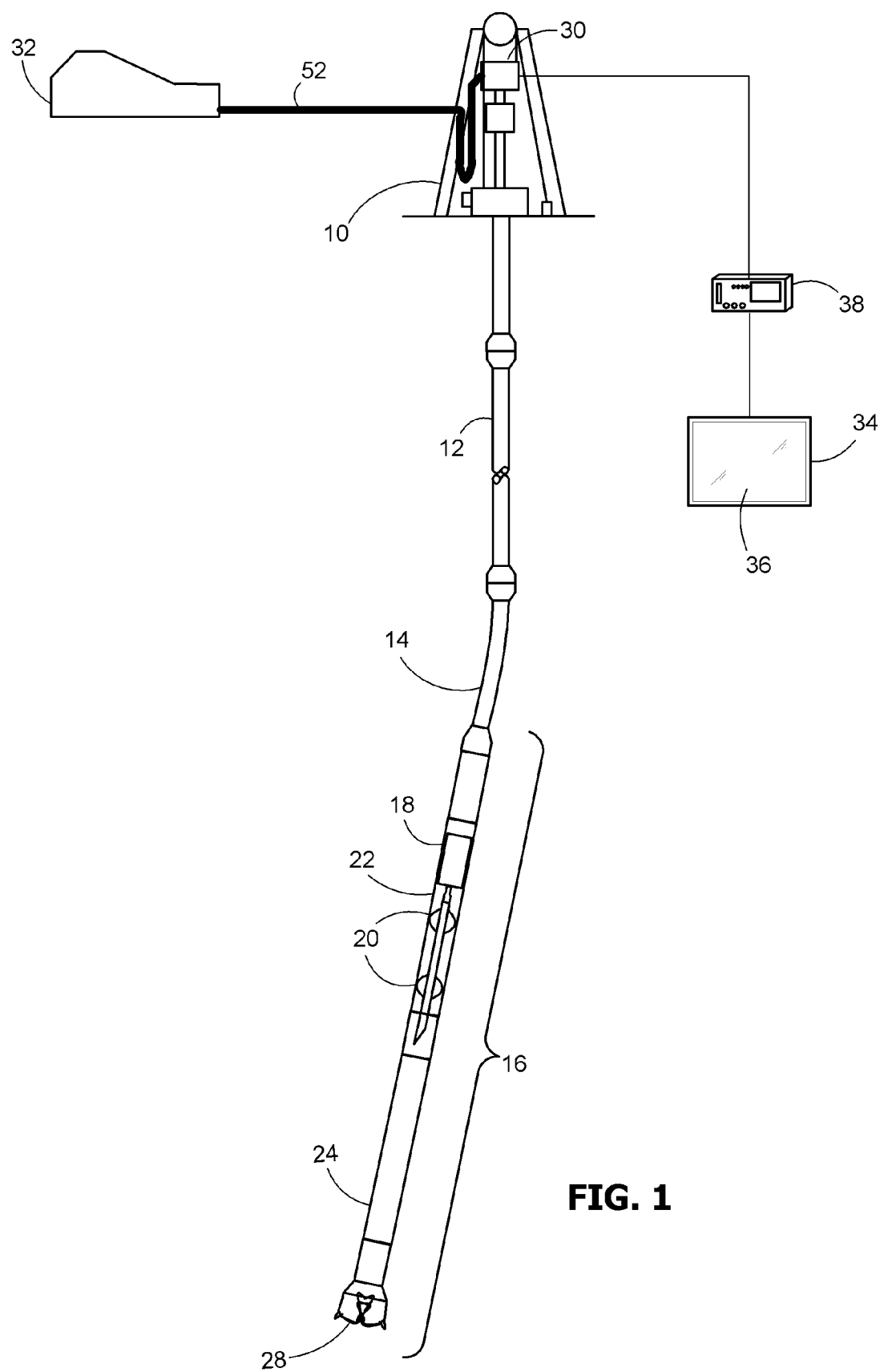
FIG. 1 is a schematic side view of a drilling rig using a method according to various embodiments of the present invention.

Referring to FIG. 1 a drilling rig 10 controls a drilling operation using a drill string 12 that comprises lengths of drill pipe 14 screwed together end to end. The drilling rig 10 may be any sort of oilfield, utility, mining or geothermal drilling rig, including: floating and land rigs, mobile and slant rigs, submersible, semi-submersible, platform, jack-up and drill ship. A typical drill string is between 0 and 5 km or more in length and has at its lowest part a number of drill collars or heavy weight drill pipe (HWDP). Drill collars are thicker-walled than drill pipe in order to resist buckling under the compression forces: drill pipe may have an outer diameter of 127 mm and a wall thickness of 9 mm, whereas drill collar may have an outer diameter of up to 250 mm and a wall thickness of 85 mm for example.

A bottom hole assembly (BHA) 16 is positioned at the lower end of the drill string 12. A typical BHA 16 comprises a MWD transmitter 18 (which may be for example a wireline telemetry system, a mud pulse telemetry system, an electromagnetic telemetry system, an acoustic telemetry system, or a wired pipe telemetry system), centralisers 20, a directional tool 22 (which can be sonde or collar mounted), stabilisers (fixed or variable) and a drill bit 28, which in use is rotated by a top drive 30 via the drill string 12.

The drilling rig 10 comprises a drilling mechanism 30. The function of the drilling mechanism 30 is to rotate the drill string 12 and thereby the drill 28 at the lower end. Presently most drilling rigs use top drives to rotate the drill string 12 and bit 28 to effect drilling. However, some drilling rigs use a rotary table and embodiments of the invention are equally applicable to such rigs. Embodiments of the invention are also equally useful in drilling any kind of borehole e.g. straight, deviated, horizontal or vertical.

A pump 32 is located at the surface and, in use, pumps drilling fluid through the drill string 12 through the drill bit 28 and serves to cool and lubricate the bit during drilling, and to return cuttings to the surface in the annulus formed between the drill string and the wellbore (not shown).

Drilling data and information is displayed on a driller's console 34 that comprises a touch screen 36 and user control apparatus e.g. keyboard (not shown) for controlling at least some of the drilling process. A digital PLC 38 sends and receives data to and from the console 34 and the top drive 30. In particular, a driller is able to set a speed command and a torque limit for the top drive to control the speed at which the drill bit 28 rotates.

Figure 2:
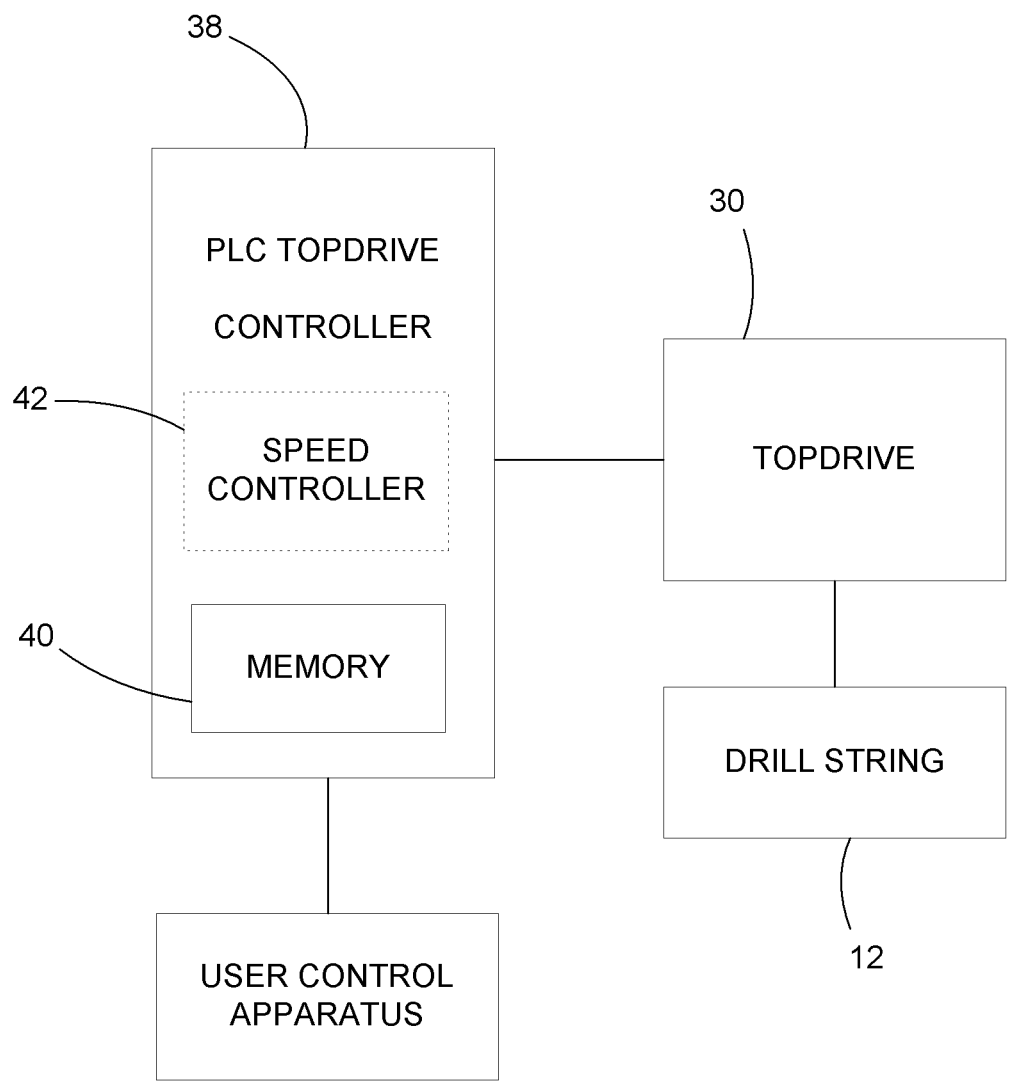
FIG. 2 is a schematic block diagram of a PLC comprising a speed controller according to various embodiments of the present invention.

Referring to FIG. 2 the PLC 38 comprises a non-volatile flash memory 40 (or other memory, such as a battery backed-up RAM). The memory stores computer executable instructions that, when executed, perform the function of a speed controller 42 for the top drive 30. The speed controller 42 comprises a PI controller with anti-windup that functions as described in greater detail below. In this embodiment the speed controller 42 is separate and distinct from the top drive 30. However, it is possible for the functionality of the speed controller as described herein to be provided as part of the in-built dedicated speed controller of a top drive. Such in-built functionality may either be provided at point of manufacture or may be part of a software upgrade performed on a top drive, either on or off site. In other embodiments the PLC may be an analogue PLC.

PI Controller Tuning

The drill string 12 can be regarded as a transmission line for torsional waves. A variation of the friction torque at the drill bit 28 or elsewhere along the string generates a torsional wave that is propagated upwards and is partially reflected at geometric discontinuities. When the transmitted wave reaches the top drive 30, it is partially reflected back into the drill string 12. For a top drive with a high inertia and/or a stiff speed controller the reflection is nearly total so that that very little energy is absorbed by the top drive.

To quantify the top drive induced damping a complex reflection coefficient r for torsional waves at the drill string/top drive interface may be defined as follows:

$$r = \frac{\zeta - Z}{\zeta + Z} \quad (1)$$

where $\zeta$ is the characteristic impedance for torsional waves and Z is the impedance of the top drive. The characteristic impedance is proportional to the cross sectional polar moment of inertia for the pipe, and varies roughly as the $4^{th}$ power of the pipe diameter. Note that the reflection coefficient is a complex function where, in general, both the magnitude and phase vary with frequency. If the speed control is stiff (i.e. $|Z|\gg\zeta$) then the reflection coefficient approaches $-1$ and nearly 100% of the torsional wave energy is reflected back down the drill string 12 by the top drive 30.

A complex representation of the top drive impedance may be derived as follows. If the anti wind-up of the speed controller is neglected (which is a non-linear function that limits torque) the drive torque of the top drive 30 can be written as:

$$T_d = P(\Omega_{set} - \Omega) + I\int(\Omega_{set} - \Omega)dt \quad (2)$$

where P and I are respective the proportional and integration factors of the speed controller, and $\Omega$ is the actual output drive speed (in rad/s) and $\Omega_{set}$ is the set point of the drive speed (in rad/s). The drive torque is actually the sum of motor torques times the gear ratio $n_g$ (motor speed/output speed, >1). Notice that speed control here refers to the output axis of the top drive. It is more common for the speed control to refer to the motor axis; in that case the corresponding P and I values for the motor speed control would then be a factor $1/n_g^2$ lower than above.

Neglecting transmission losses, the equation of motion of the top drive output shaft is:

$$J\frac{d\Omega}{dt} = T_d - T \quad (3)$$

where J is the effective inertia of the drilling mechanism (including gear and drive motors) and T is the external torque from the string. In this embodiment, the effective inertia is equal to the total mechanical inertia of the drilling mechanism 30. Combining equations (2) and (3) and applying the Fourier transform gives the following equation of motion:

$$\left(i\omega J + P + \frac{I}{i\omega}\right)\Omega = \left(P + \frac{I}{i\omega}\right)\Omega_{set} - T \quad (4)$$

For simplicity, the same variable names have been used as in the time based equations, although $\Omega$, $\Omega_{set}$ and T now represent complex amplitudes. The implied time factor is $\exp(i\omega t)$, where $i=\sqrt{-1}$ is the imaginary unit and $\omega=2\pi f$ is the angular frequency of the top drive 30. If we assume there is no cascade feedback through the set speed (as found in torque feed-back systems), the set speed amplitude vanishes and the equation above simplifies to:

$$T = -\left(i\omega J + P + \frac{I}{i\omega}\right)\Omega \quad (5)$$

The negative ratio $-T/\Omega$ is called the top end impedance Z of the string:

$$Z = i\omega J + P + \frac{I}{i\omega} \qquad (6)$$

This impedance can easily be generalized to an ideal PID controller, by adding a new term $i\omega D$ to it, where D is the derivative term of the controller. A (normal) positive D-term will increase the effective inertia of the top drive (as seen by torsional waves travelling up the drill string), while a negative factor will reduce it. In practice, because time differentiation of the measured speed is a noise driving process that enhances the high frequency noise, the D-term in a PID controller is normally combined with a low pass filter. This filter introduces a phase shift that makes the effective impedance more complicated and it therefore increases the risk of making instabilities at some frequencies, as explained below. Therefore, although a PID controller with a D-term could be used to perform the tuning aspect of some embodiments of the invention, it is not recommended. However, in another aspect of the invention described below, we have found a way to adjust the effective inertia of the drilling mechanism without this disadvantage.

Combining equations (1) and (6) gives the following expression for the reflection coefficient, valid for PI type speed controlled top drives:

$$r = -\frac{P - \zeta + i \cdot \left(\omega J - \frac{I}{\omega}\right)}{P + \zeta + i \cdot \left(\omega J - \frac{I}{\omega}\right)} \qquad (7)$$

Its magnitude has a minimum equal to:

$$|r|_{min} = \frac{|P - \zeta|}{P + \zeta} \qquad (8)$$

when the imaginary terms vanish, that is, when the angular frequency of the top drive 30 equals $\omega = \sqrt{I/J}$. For standard stiff speed controllers this frequency is normally higher than the stick-slip frequency (see FIG. 3 and associated description). However, we have discovered that adjustment of the I-term of the PI controller also adjusts the peak absorption frequency of torsional waves by the top drive 30. In particular, the I-term can be adjusted so that the maximum energy absorption of torsional waves occurs at or near the stick-slip frequency $\omega_s$ (i.e. when the magnitude of the reflection coefficient is minimum) as follows:

$$I = \omega_s^2 J \qquad (9)$$

This realization is significant since, as a first step to achieving good damping, the I-term of the PI controller is only dependent on the stick-slip frequency and the effective inertia of the top drive 30. Since the effective inertia is readily determined either in advance of operation or from figures quoted by the manufacturer, and since the stick-slip frequency can be readily determined during drilling, this makes tuning of the PI controller straightforward whilst achieving good energy absorption by the top drive 30 of the stick-slip oscillations.

This first step in tuning the speed controller is a good first step towards effective dampening of stick-slip oscillations. However, the damping can be further improved. In particular the untuned P-term of the speed controller is still too high, that is $P \gg \zeta$ keeping the reflection coefficient close to $-1$. We have discovered that to obtain sufficient damping of the stick-slip oscillations the P-term of the speed controller must be lowered so that it is of the same order of magnitude as the characteristic impedance $\zeta$. However, we have also discovered that it is not desirable that the reflection coefficient vanishes completely, because that would radically change the dynamics of the drill string 12 and the pendulum mode would split into two new modes, each with a different frequency. Furthermore an extremely soft speed controller that absorbs nearly all of the incident wave energy will cause very high speed fluctuations of the top drive 30, in response to variations of the downhole torque. This can reduce drilling efficiency.

We have discovered that the P-term can be selected as a non-integer multiple of the characteristic impedance $\zeta$ of the drill string, which may be expressed as $P = \zeta/a$ where a is a normalised mobility factor (dimensionless) less than unity, which is operator or computer adjustable within certain limits as described below. Having set the I-term to cause the imaginary part of equation (7) to vanish, setting the P-term as described causes the minimum of the reflection coefficient (i.e. the peak absorption of energy by the top drive) at the stick-slip frequency $\omega_s$ to become:

$$|r|_{min} = \frac{1-a}{1+a} \qquad (10)$$

By permitting adjustment of the mobility factor a, the amount of energy reflected back down the drill string 12 can be controlled, within limits. These limits can be set by permitting only a certain range of values for a, such as 0.05 to 0.33. This corresponds to a range for the magnitude of $r_{min}$ from about 0.9 to 0.5. It is believed that this range enables the damping to be controlled so that stick-slip oscillations can be inhibited. If the speed controller 42 is much stiffer than this (i.e. a reflection coefficient greater than about 0.9) we have found that too much of the torsional energy of the stick-slip oscillations is reflected back down the drill-string 12. Furthermore, if the speed controller 42 is too soft (i.e. a reflection coefficient less than about 0.5) we have found that drilling performance (e.g. in terms of ROP) can be affected.

A standard speed controller is designed to keep the motor speed constant and the true P and I constants refer to the motor axis. A typical drive motor with a nominal power of 900 kW and a rotor inertia of $J_m = 25$ kgm$^2$ is typically controlled by a motor speed controller of $P_m = 500$ Nms. The speed controller I-factor is most often given indirectly as the P-factor divided by a time integration constant of typically $\tau_i = 0.3$ s. As an example, assume a drive with one motor connected to the output shaft with a gear having an inertia $J_g = 250$ kgm$^2$ and a gear ratio of $n_g = 5.32$. The effective drive inertia (i.e. total mechanical inertia) is then $J_d = J_g + n_g^2 J_m = 960$ kgm$^2$. The effective speed controller factors referred to the output shaft is similarly $P = n_g^2 P_m \approx 14000$ Nms and $I = P/\tau_i 47000$ Nm. In comparison, the characteristic impedance for a typical 5 inch pipe with $\zeta \approx 340$ Nms, which is only 2.4% of the real part of the drive impedance.

Figure 3:
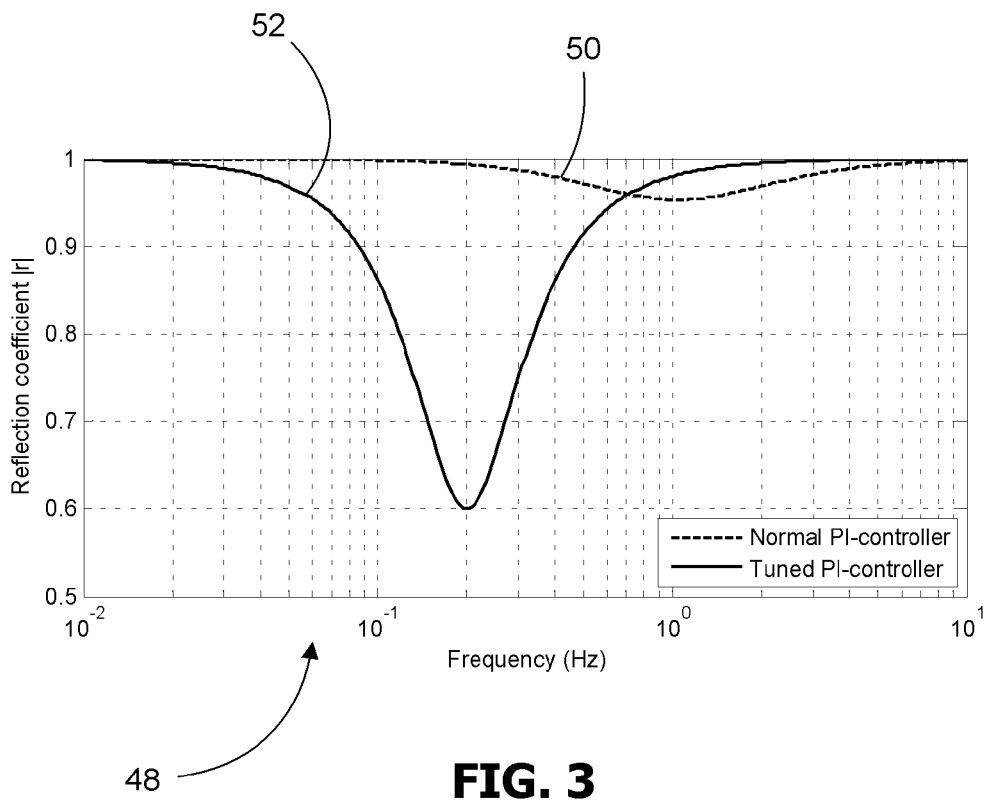
FIG. 3 is a graph of frequency versus reflection coefficient showing a comparison between a drilling mechanism using a speed controller according to a first embodiment of the present invention and a standard speed controller.

FIG. 3 is a graph 48 of the magnitude of the reflection coefficient $|r|$ versus frequency and shows the difference between a standard stiff speed controller (curve 50) and a speed controller tuned according to various embodiments of the invention (curve 52). The latter is calculated with a mobility factor of a=0.25 and an I-term providing maximum damping at 0.2 Hz (5 s stick-slip period). At this frequency the reflection is reduced from about 0.993 (standard PI controller) to 0.6 (PI controller tuned as above), which represents a dramatic improvement in the damping by the top drive at the stick-slip frequency.

It is worth emphasizing the fact that in both cases the reflection coefficient stays below 1 but approaches this limit as the frequency approaches either zero or infinity. Therefore, the standard PI-controller never provides a negative damping that would otherwise amplify torsional vibration components. However, the damping is poor far away from the relatively narrow the absorption band at 1-2 Hz. In contrast, the tuned PI controller provides a comparatively wide absorption band with less than 80% reflection between about 0.1 Hz and 0.4 Hz. There is even a substantial damping effect remaining (|r|=0.965) at 0.6 Hz, which is three times the stick-slip frequency and close to the second resonance frequency of the drill string.

The effective inertia J of the drilling mechanism, the characteristic impedance $\zeta$ and the stick-slip frequency $\omega_s$ change the absorption bandwidth of the frequency-reflection curve in FIG. 3. In particular, the absorption bandwidth is inversely proportional to the ratio $\omega_s J/\zeta$. For a drilling mechanism with a large effective inertia and/or a slender drill pipe making this ratio larger (e.g. greater than 5), the absorption bandwidth narrows. In that case, it becomes more important to ensure that the estimated stick-slip period is determined more accurately (if possible) so that the frequency of maximum damping is as close as possible to the actual stick-slip frequency.

The reduction in reflection coefficient magnitude and corresponding positive damping over the entire frequency band is very important and is achieved with only a single PI controller. This is in contrast to other active methods that use cascade feed-back loops in series with a standard speed controller, or that rely on some measured parameter such as drive or string torque to provide a feedback signal to the PLC. The filters used in the cascade feed-back functions can be suitable for damping the fundamental stick-slip oscillations but they can cause negative damping and instabilities at higher frequencies.

In practice, the P-term for the tuned speed controller may be determined as follows:

$$P = \frac{\zeta}{a} = \frac{GI_p}{ca}$$

where G is the shear modulus of the drill string (typical value is $80 \times 10^9$ Nm$^{-2}$), $I_p$ is the cross-sectional polar moment of inertia of the drill string (typical value is $12.2 \times 10^{-6}$ m$^4$) and c is the speed of torsional waves in the drill string (typical value is 3192 ms$^{-1}$).

To determine the I-term in practice, there are two variables to be estimated: (a) the angular frequency $\omega_s$ of stick-slip oscillations, and (b) the effective inertia J of the top drive. The latter is relatively straightforward to determine and can either be calculated from theoretical values of the gear inertia, the gear ratio and the motor rotor inertia, or it can be found experimentally by running an acceleration test when the top drive 30 is disconnected from the string. A typical formula for calculating top drive inertia $J_d$ is:

$$J_d = J_g + n_m n_g^2 J_m$$

where $J_g$ is top drive inertia with the motor de-coupled (typical value 100 kgm$^2$), $n_g$ is the gear ratio (>1), $n_m$ of active motors (default value is 1), and $J_m$ is the rotor inertia of the motor (typical value is 25 kgm$^2$).

There are several ways that the angular frequency $\omega_s$ may be estimated, including: (i) calculations from string geometry, (ii) by manual measurement (e.g. using a stop watch) and (iii) by automatic determination in the PLC software. An important advantage of the PI tuning aspect of embodiments of the invention is that the damping effect of stick-slip oscillations is still obtained even if the estimate of the stick-slip period used to tune the PI controller is not very accurate. For example, FIG. 3 shows maximum damping occurring at a frequency of 0.2 Hz. Even if the real stick-slip frequency is lower or higher than this, there is still a good damping effect (r~0.8) obtained between about 0.09 Hz and 0.4 Hz. Accordingly, the methods used to estimate stick-slip period do not have to be particularly accurate.

(i) String Geometry

It is possible to take a theoretical approach to determine the stick-slip period using parameters of the drill-string available on-site in the tally book. A tally book is compiled on site for each drill string and comprises a detailed record of the properties of each section of drill string (e.g. OD, ID, type of pipe), a section being defined as a length (e.g. 300 m) of the same type of drill pipe.

In the following it is assumed that the drill string 12 consists of one drill pipe section of length l with a lumped bit impedance at the lower end, represented by $Z_b$. This impedance can be a pure reactive inertia impedance (i$\omega J_b$, where $J_b$ is the inertia of the bottom hole assembly) or it can be a real constant representing the lumped damping (positive or negative) at the drill bit 28. The torque equations at the top and at the bit represent the two boundary conditions. It can be shown that these two boundary conditions can be written as the following matrix equation.

$$\begin{bmatrix} \zeta + Z_d & \zeta - Z_d \\ (\zeta - Z_b)e^{-ikl} & (\zeta + Z_b)e^{ikl} \end{bmatrix} \cdot \begin{bmatrix} \Omega^+ \\ \Omega^- \end{bmatrix} = \begin{bmatrix} 0 \\ 0 \end{bmatrix} \quad (11)$$

where k is the wavenumber and $Z_d$ is the impedance of the drilling mechanism.

No-trivial solutions to this system of equations exist if the determinant of the system matrix vanishes, that is, when $$e^{i2kl} = \frac{(\zeta - Z_d)(\zeta - Z_b)}{(\zeta + Z_d)(\zeta + Z_b)} = r_d r_b \quad (12)$$

Here reflection coefficients at the drive $r_d$ and at the bottom of the drill string $r_b$ have been introduced as follows:

$$r_d = \frac{\zeta - Z_d}{\zeta + Z_d}$$

$$r_b = \frac{\zeta - Z_b}{\zeta + Z_b}$$

Notice that the top drive reflection coefficient $r_d \approx -1$ for a stiff speed controller ($|Z_d| \gg \zeta$) and the bit reflection coefficient $r_b$ equals unity for a free lower end ($Z_b = 0$).

The roots of equation (12) can be written as:

$$i2kl = \ln(r_d r_b) = \ln|r_d r_b| + i(n2\pi + \alpha_d + \alpha_b) \quad (13)$$

where m is a non-negative integer and $\alpha_d$ and $\alpha_b$ are the arguments (phase angles) of the complex reflection coefficients $r_d$ and $r_b$, respectively. The corresponding angular resonance frequencies are $$\omega_n = (\alpha_d + \alpha_b + n2\pi - i\ln|r_d r_b|)\frac{c}{2l} \quad (14)$$

Since, in general, the magnitudes and phases of the reflection coefficient are frequency dependent, the above equation is transcendent, without explicit analytic solutions. However, it can be solved numerically by a PC or other computer.

The imaginary term of the above equation represents the damping of the eigenmodes. If $|r_d r_b|<1$ the imaginary part of the root is positive, thus representing a normal, positive damping causing the time factor $\exp(i\omega_n t)$ to decay with time. In contrast, if $|r_d r_b|>1$ the damping becomes negative, causing a small amplitude to grow exponentially with time.

As an example, consider a case with a completely stiff speed controller ($|r_d|=-1$ and $\alpha_d=\pi$) rotating a drill string having a finite bottom hole inertia ($Z_b=i\omega J_b$, $|r_b|=1$ and $\alpha_b=-2\tan^{-1}(\omega J_b/\zeta)$). Then the lowest (theoretical stick-slip) frequency $\omega_s$ becomes:

$$\omega_s = \left(\pi - 2\tan^{-1}\left(\frac{\omega_s J_b}{\zeta}\right)\right)\frac{c}{2l} \quad (15)$$

With no extra bottom hole assembly inertia this expression reduces to $\omega_s=\pi c/(2l)$. Notice that the resonance frequency decreases as the inertia $J_b$ increases. In the extreme case when $\omega_s J_b \gg \zeta$ the above formula can be rewritten as $\omega_s \approx 1\sqrt{J_b C}$ where $C=l/(GI_p)$ is the static compliance of the string. This is the well-known formula for the natural frequency of a lumped inertia and spring system.

We have found that it is useful to study the relation between lower end speed amplitude $\Omega_s \equiv \Omega(x=l)$ and the corresponding top torque $T_s \equiv T(x=0)$. It can be shown from the equations above that this ratio is $$\frac{\Omega_s}{T_s} = \frac{r_d\exp(-ikl)+\exp(ikl)}{\zeta(r_d-1)} = -i\frac{\sin(kl)}{\zeta} - \frac{(1+r_d)\cos(kl)}{(1-r_d)\zeta} \quad (16)$$

Using the fact that characteristic impedance can be written as $\zeta = kl/(\omega C)$ the down hole speed amplitude can be expressed by $$\Omega_s = -\frac{\sin(kl)}{kl}C\cdot i\omega T_s - \frac{(1+r_d)\cos(kl)}{(1-r_d)kl}C\omega T_s \quad (17)$$

Notice the that the second term vanishes if the speed controller is very stiff ($r\approx-1$) or when $kl\approx\pi/2$. However if a soft speed controller is used and there is a high inertia near the bit so that kl for the stick-slip frequency is significantly less than $\pi/2$, then the second term may be significant and should not be omitted.

The theory above can be generalized to strings with many sections and also to cases with distributed damping. If a linear damping term is included, the generalization causes the wave number and characteristic impedances to be complex and not purely real. If the string consists of n uniform sections the general wave solution consists of 2n complex speed amplitudes, representing pairs of up and down propagating waves. Continuity of angular speed and torsion across the section boundaries can be expressed by 2(n−1) internal boundary conditions, which add to the two end conditions in equation (11). These can be set up as a homogeneous 2n×2n matrix equation. The roots of this system of equations are those frequencies making the system matrix singular. Although it is possible to find an analytic expression for the system determinant, the solutions are found numerically by a PC or other computer on site. IADC/SPE 15564 provides an example of one way to do this, and its content is hereby incorporated by reference for all purposes.

FIGS. 4A' and 4A" show a typical window 50 available on the driller's console that enables the driller to trigger a PC to estimate a new stick-slip period based on string geometry. In particular a table 52 represents the sections of the drill string including BHA, heavy-weight drill pipe (HWDP), and drill pipe sections 1 to 6. Available fields for each section are: length, outer diameter and inner diameter. The driller firstly determines from the on-site tally book how many sections the drill string is divided into. In this example the drill string has eight sections. For each section the driller enters figures into the three fields. A button 54 enables the driller to trigger a new stick-slip period to be estimated based on the string geometry entered in the table 52. In particular, the table establishes the 2n×2n matrix equation mentioned above and the PL (not shown) uses a numeric method to find the roots of the matrix that make the matrix singular. The smallest root is the stick-slip period output 56 in the window 50.

(ii) Manual Estimation

To determine the stick-slip period manually, the driller may observe the drive torque as displayed on the driller's console 34 and determine the period by measuring the period of the variation of the drive torque with a stopwatch. This is readily done since each period is typically 2 s to 10 s. An alternative method is for the driller to listen to the change in pitch of the top drive motor and to time the period that way. As mentioned above, such methods should be sufficient as the estimated stick-slip frequency does not have to be particularly close to the real stick-slip frequency in order that the stick-slip oscillations are damped.

(iii) Automatic Estimation

Automatic estimation means that the PLC software estimates the stick-slip period or frequency from measurements made during drilling. In particular, the top drive torque signal is filtered by a band-pass filter that passes frequencies in the range 0.1 Hz to 0.5 Hz (i.e. a period of between 2 s and 10 s), that is the filter favours the stick-slip component and suppresses all other frequency components. The PLC then detects the period between every new zero up-crossing of the filtered torque signal and uses these values in a recursive smoothing filter to obtain a stable and accurate period estimate. The final smoothing filter is frozen when either the stick-slip severity (see below) falls below a low critical value, or the tuning method is activated.

To help the period estimator to quickly find the accurate period, the operator can either put in a realistic starting value or pick a theoretical value calculated for the actual string (determined as per String Geometry section above).

In use, the tuned PI controller is activated when there is a significant stick-slip motion (as determined by the driller or by software). However, the stick-slip frequency estimation (period measurement) takes place before the tuned PI controller is actually used to control the drilling mechanism. Once complete the period estimator is turned off when PI controller is on, because the natural period of the stick-slip oscillations can change slightly when soft speed control is used.

There does not appear to be a need for very frequent retuning of the estimated frequency because the natural stick-slip frequency varies slowly with drill string length. It is a good idea, however, to automatically update the period at every connection i.e. when another 30 m of drill pipes are added to the drill string. To do that it is possible to use theoretical sensitivity analysis to predict how the stick-slip period increases with drill string length. One way to do this (but not the only way) is to find the theoretical periods for two string lengths (L and L+200 m, say) and then use interpolation for the increase caused by the addition of a 30 m section in order to update the estimated period.

Estimation of Stick-Slip Severity and Instantaneous Bit Speed

An additional aspect of some embodiments of the invention is provided as a set of computer executable instructions in the PLC software that enables quantification of bit speed variations and an estimate of the instantaneous bit rotation speed. 'Bit speed' means the BHA rotation speed excluding the contribution from an optional mud motor. This aspect may be provided separately from or in combination with the PI controller tuning.

This estimation is achieved by combining the known torsional compliance C of the drill string and the variations of the drive torque. In general, since the torque is not a strictly periodic signal but often possesses a wide range frequencies, an accurate calculation is extremely complicated and is therefore not suitable for implementation in a PLC. However, we have realised that since the stick-slip motion is dominated by the fundamental stick-slip frequency, it is possible to achieve fairly good estimates based on this frequency only.

The key equation is (17) above, which describes a good approximation for the complex speed amplitude as a function of the top string torque. The two terms in this expression must be treated differently because they represent harmonic components having a 90 degrees phase difference. While the imaginary factor $i\omega T_s$ should be treated as the time derivative of the band pass filtered torque, the real term factor $\omega T_s$ can be approximated as the product of the band pass filtered torque and the stick-slip frequency. Since the band pass filter suppresses all frequencies except the stick slip-frequency, it is possible to substitute direct time integration by an integration based approximation. This approximation is based on the fact that $i\omega \approx -\omega_s^2/(i\omega)$, where $1/(i\omega)$ represents time integration. This approximation favours the stick-slip frequency and suppresses higher harmonics. The time domain version of (17) suitable for implementation in the PLC 38 is:

$$\Omega_b = -\frac{\sin(kl)}{kl} C \cdot \frac{dT_{bp}}{dt} - \frac{(1+r_d)\cos(kl)}{(1-r_d)kl} C\omega_s T_{bp} \approx \frac{\sin(kl)}{kl} C \cdot \omega_s^2 \int T_{bp} dt \quad (18)$$

Here the phase parameter $kl=\omega_s l/c$. In the last approximation the integral approximation for time derivation is used and the second term is omitted.

Even though the formula above is based on a single section string, simulations have shown that it also provides good estimates for multi-section strings if the total string compliance C is used:

$$C = \sum_{j=1}^{m} \frac{l_j}{I_{p,j} G} \quad (19)$$

A version of the algorithm implemented in the PLC 38 to estimate both instantaneous BHA speed and a stick-slip severity, comprises the following steps.

1. Estimate the string torque by correcting for inertia effects (subtract the effective motor inertia times the angular acceleration) and by using the gear ratio to scale it properly;
2. Band pass filter the estimated torque with a band pass filter centred at the observed/estimated stick-slip frequency. The filter should be of 2nd order or higher, but can preferably be implemented in the PLC as a series of 1st order recursive IIR filters;
3. Calculate the total static drill string compliance using equation (19) above;
4. Calculate the phase parameter $kl=\omega_s l/c$ where $\omega_s$ is the determined angular stick-slip frequency;
5. Calculate the dynamic downhole speed by using either the accurate or the approximate version of equation (18) above;
6. Calculate the "stick-slip severity" σ, which is the normalized stick-slip amplitude, determined as the ratio of dynamic downhole speed amplitude over the mean top drive rotational speed;
7. Find the instant speed as the sum of the low pass filtered top drive speed and the estimated dynamic downhole speed. Clip to zero if the estimated speed goes negative;
8. Output data to be plotted on a graph (e.g. RPM versus time) shown on a display on a driller's console for example;
9. Repeat steps 1 to 8 to provide substantially real-time estimate of bit speed.

It is envisaged that this method could be performed where only the BHA speed estimate is output or only the stick-slip severity is output.

Regarding step 6, a possible way of estimating the stick-slip severity is to use the following formula where LP( ) denotes low pass filtering:

$$\sigma = \frac{\sqrt{2 \cdot LP(\Omega_b^2)}}{\Omega_{set}} \quad (20)$$

Because the above method takes the reflection coefficient into account, it applies both for a standard and tuned speed control. During acceleration transients when the top drive speed is changed significantly the estimator is not reliable but can give large errors. Nonetheless we believe this is a useful tool for assessing downhole conditions, either automatically in software or by display for analysis by a driller.

The ratio of dynamic speed amplitude to the average top drive speed is a direct and quantitative measurement of the stick-slip motion, more suitable than either the dynamic torque or the relative torque amplitude. Even though the estimated bit speed is not highly accurate, it provides a valuable input to the driller monitoring of it in a trend plot will give the operator more explicit information on what is happening at the bit.

User Interface

A user interface is provided for the driller's console 34 that comprises a graphical interface (see FIGS. 4A' and 4A", and 4B' and 4B") which provides the operator with direct information on the stick-slip status. Stick-slip is indicated by three different indicators:

A "traffic light" indicator 58 in FIG. 4A' with 3 levels of stick-slip: a green light for small amplitudes (0-30%), a yellow warning light if the speed oscillations are significant (30-70%) and finally a red light if even higher amplitudes are estimated. This percentage value is based on the stick-slip severity as determined above.

Figure 4B:
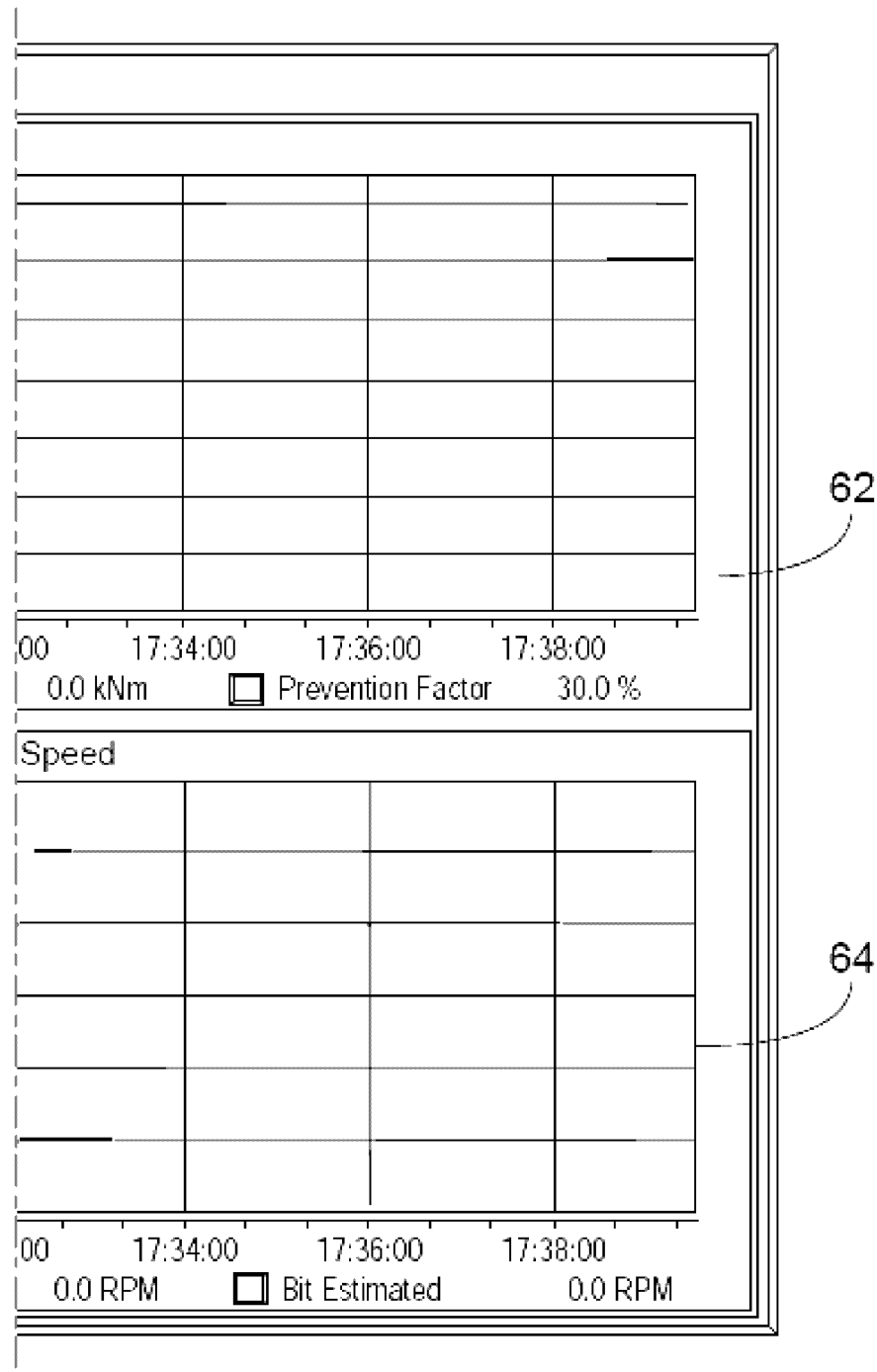
FIGS. 4B' and 4B" is a screenshot of a second window available on a driller's console that illustrates real-time drive torque and an estimate of downhole rotation speed of the bottom hole assembly in FIG. 1.

The stick-slip severity is plotted in a plot 62 of torque versus time in FIGS. 4B' and 4B" to see how the stick-slip has developed over a specified period of time.

The instant bit speed estimate in a plot 64 of instantaneous bit speed versus time in FIGS. 4B' and 4B" giving a visual and direct impression of the down hole stick-slip status.

As mentioned above, the window 50 requires the operator to input a rough description of the string, in terms of a simplified tally. This tally accepts up to 8 different sections where the length, outer diameter and mass per unit length are specified. This information is used for calculating both the theoretical estimated frequency for the lowest mode and the static drill string compliance at this frequency.

The operator can switch the tuned PI controller on or off. In the off state, the standard drive speed controller is used. When the tuning is turned on, this speed controller is bypassed by the tuned PI controller 42 which is implemented in the PLC 38. If the drive controller in the top drive 30 is a modern digital one, it is also possible to change drive speed controller itself, instead of bypassing it. However, if the bypass method is chosen, this is achieved by sending a high speed command from the PLC 38 to the speed controller in the top drive 30 and by controlling the output torque limit dynamically. In normal drilling this torque limit is used as a safety limit preventing damage to the string if the string suddenly sticks. In the tuned control mode, when the PLC 38 controls the torque limit dynamically, this limit is substituted by a corresponding software limit in the PLC 38.

The operator can also change the prevention or mobility factor a within preset limits via buttons 60, typically between 0.05 and 0.33. A high factor implies a softer speed control and less probability for the stick-slip motion to start or persist. The disadvantage of a high factor is larger fluctuations of the top drive speed in response to harmless changes in the string torque level. It may be necessary to choose a high factor to cure severe stick-slip oscillations but the operator should reduce the factor when smooth drilling is restored.

It is envisaged that the decision to activate and de-activate the tuned speed control may be taken by the PLC 38 or other electronic controller. Such a controller may monitor the instantaneous estimate of bit speed as set out above. When a period pattern of stick-slip is observed, the controller may activate the tuning. Furthermore the controller may gradually increase the mobility or prevention factor to increase the softness of the top drive 30 if the stick-slip oscillations do not reduce in magnitude over a predetermined period e.g. 2 minutes. Once the stick-slip oscillations have reduced or substantially disappeared the controller may gradually reduce the mobility factor (e.g. down to a=0.1) to improve drilling efficiency.

HIL Testing

The PI tuning method has recently been extensively tested in so-called Hardware In the Loop (HIL) simulations. In these tests the PLC programs are run on a physical PLC interfacing to a real-time simulation model of the drive and the drill string.

The simulation model being used for the HIL testing of tuning method has the following features:

1. The drive is modelled as a standard PI speed controller with torque and power limitations and anti-windup. The torque or current controller is perfect in the sense that the actual torque is assumed to match the set torque with no delay.
2. The model can handle a plurality of drive motors connected to the output shaft by a gear.
3. The drill string is modelled as a series of lumped inertia and spring elements derived from any tally book. The grid length used in most examples below is approximately 28 m, which is the typical length of a triple stand. Hence the 3200 m long string used below consists of 114 elements.
4. The static friction torque is calculated for every element, based on the theoretical contact force being a function of weight and inclination, curvature and tension. The effect of WOB and bit torque is also included.
5. The dynamic, speed dependent friction torque is modelled as a sum of three terms. The first term is a soft-sign variant of the Column friction, the second represents and extra static start friction and the third is a linear damping term, independent of the contact force. To simulate instability with growing oscillation amplitude from smooth drilling, this damping coefficient must be negative.

The model was first developed as a Simulink model under the Matlab environment. It is later implemented with the Simulation Module toolbox under the National Instrument LabView environment and run on a powerful PC platform. Although this PC is not using a real time (RT) operative system, its high power makes the model RT for all practical purposes.

The LabView simulation program is linked to the PLC by a so-called SimbaPro PCI profibus DP (Distributed Peripherals) card, which can simulate all DP nodes connected to the PLC. The update time is set to 10 ms (100 Hz), which is within the PLC cycle time (typically 20 ms).

Figure 5:
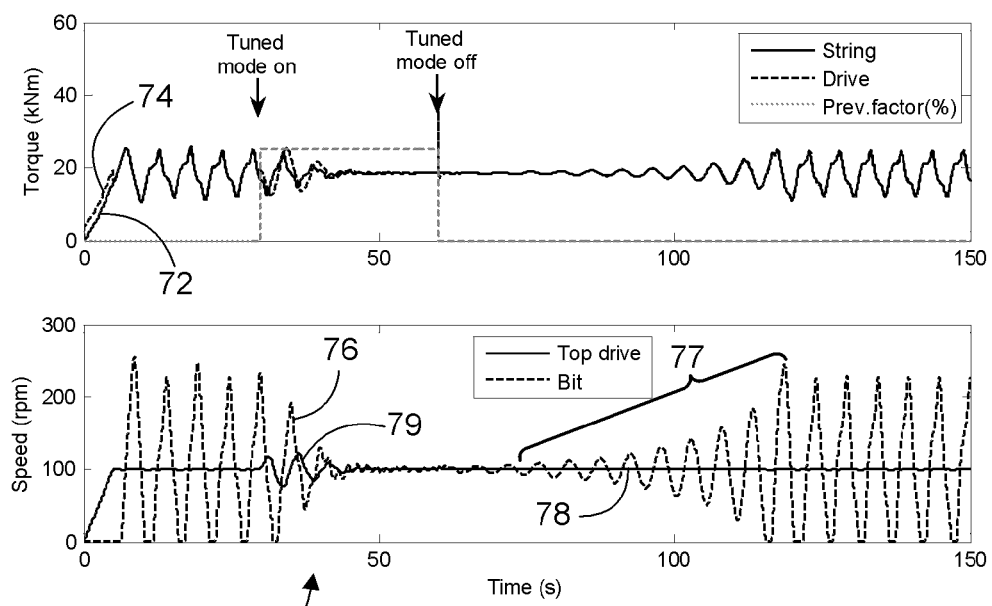
FIGS. 5 and 6 are graphs illustrating results of a computer simulation modelling of a first method according to various embodiments of the present invention.

Results from the HIL testing are shown in FIG. 5. The string used is 3200 m in length similar to the string used in the field test (see below). The theoretical period for the lowest mode is 5.2 s. FIG. 5 shows a graph 70 of the torque and speed for the drill string (trace 72) and for the top drive (trace 74) during a 150 s period including a 5 s interval where the top drive speed is accelerated from zero to 100 rpm. The tuned speed control is turned on 30 s after start of rotation. Steady stick-slip oscillations are established soon after the start up. The stick-slip period stabilizes around 5.3 s. This is slightly longer than the theoretical pendulum period, but the extended period is consistent with the fact that the sticking interval is substantial. Note that the top drive speed is nearly constant during this part of the speed control.

When the tuned speed control is turned on, the top drive speed (trace 78) temporarily shows a pronounced dynamic variation 79 in response to the large torque variations. But after a few periods the stick-slip motion fades away and the top drive speed, as well as the bit speed, become smooth. When tuned speed control is turned off again, the down-hole speed (trace 76) amplitude starts to grow, until full stick-slip motion is developed. This instability is a consequence of the negative damping included in the string torque model.

Figure 6:
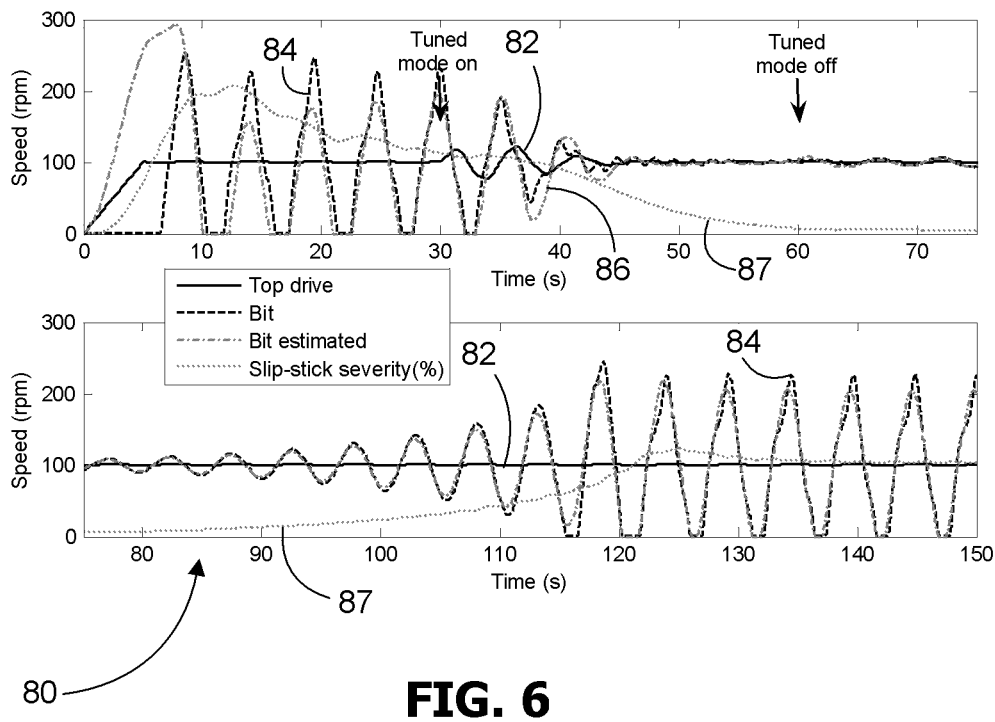

FIG. 6 shows results 80 from the same simulations, but now with focus on the PLC estimated stick-slip severity (trace 87) and instantaneous bit speed (trace 84)—note that the lower graph is a continuation of the upper graph and shows the difference between simulated speed (trace 84) and estimated speed (trace 86). The bit speed estimate is fairly good during steady conditions but has significant error during start-up. Despite this, the estimated bit speed is able to provide the driller with a useful picture of down hole speed variations. The effectiveness of the tuned speed controller is clearly illustrated by the trace 87 of stick-slip severity: when tuned speed control is in use, the stick-slip severity falls almost to zero. Once tuned control is switched off, the stick-slip severity increases once again.

Field Test

The tuning has been tested in the field, while drilling a long deviated well. The string was approximately 3200 m long with a 5.5 inch drill pipe. Unfortunately, the test ended after a relative short period of severe stick-slip conditions, when the PDC bit drilled into a softer formation. The new formation made the bit less aggressive with less negative damping, thus removing the main source of the stick-slip oscillations.

Figure 7:
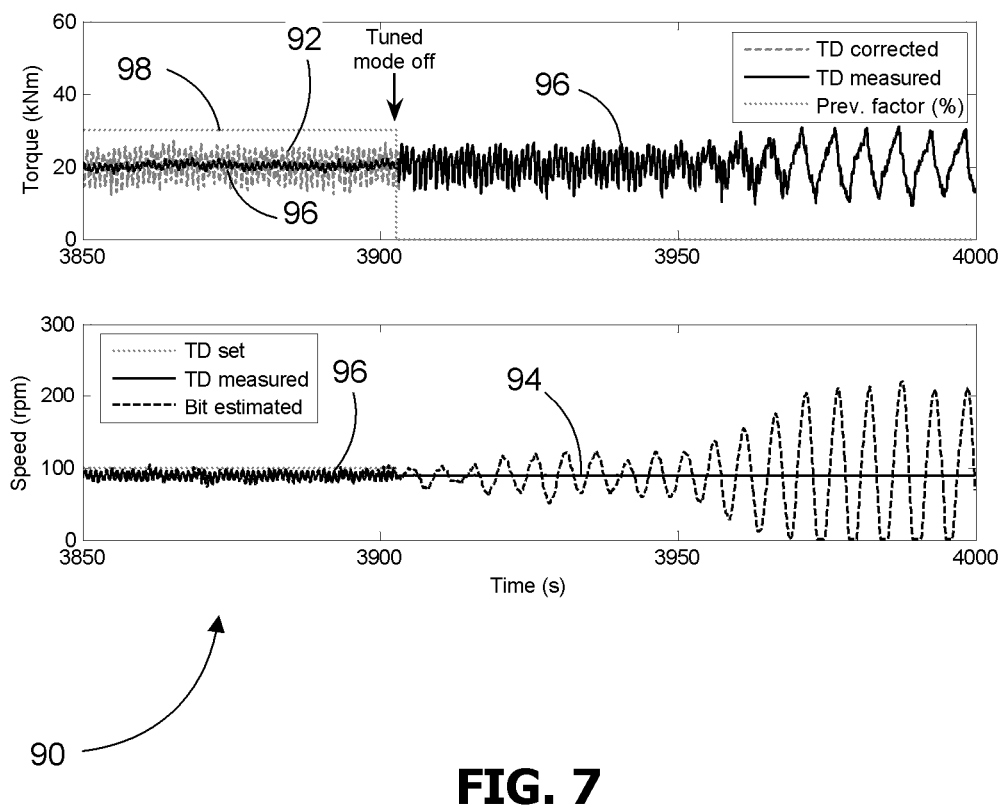
FIGS. 7 and 8 are graphs illustrating results of a test of a method according to various embodiments of the present invention.

FIG. 7 shows an example where stick-slip motion is developed while rotating with the standard stiff speed controller. Two graphs 90 are shown: one of drive torque versus time, and the other of bit speed versus time. A few comments on these graphs are given below:

The data was recorded from the PLC at a sampling rate of approximately 9 Hz.

The "TD corrected" torque (trace 92) is the estimated string torque and equal to the measured drive torque corrected for inertia effects.

The TD corrected torque as well as the bit speed are estimated by post processing the recorded data using the methods described above.

The standard top drive speed controller is very stiff, because variations of the measured speed (trace 94) can barely be seen after turning off the tuned speed control and the top drive rpm is virtually constant. The corresponding small accelerations are the reason why the measured drive torque almost matches the inertia corrected string torque during this period.

The high frequency torque oscillations (at 1.1 Hz) seen during first part of the trace 96 when tuning is on probably come from a higher mode resonance in the drill string. These vibrations seem to be independent of the type of speed controller used, but they vanish when stick-slip is developed.

The prevention factor (line 98) is the operator set mobility factor a mentioned above.

The observed stick-slip period is approximately 5.2 s, which is in good agreement with the theoretical period for this particular string.

Figure 8:
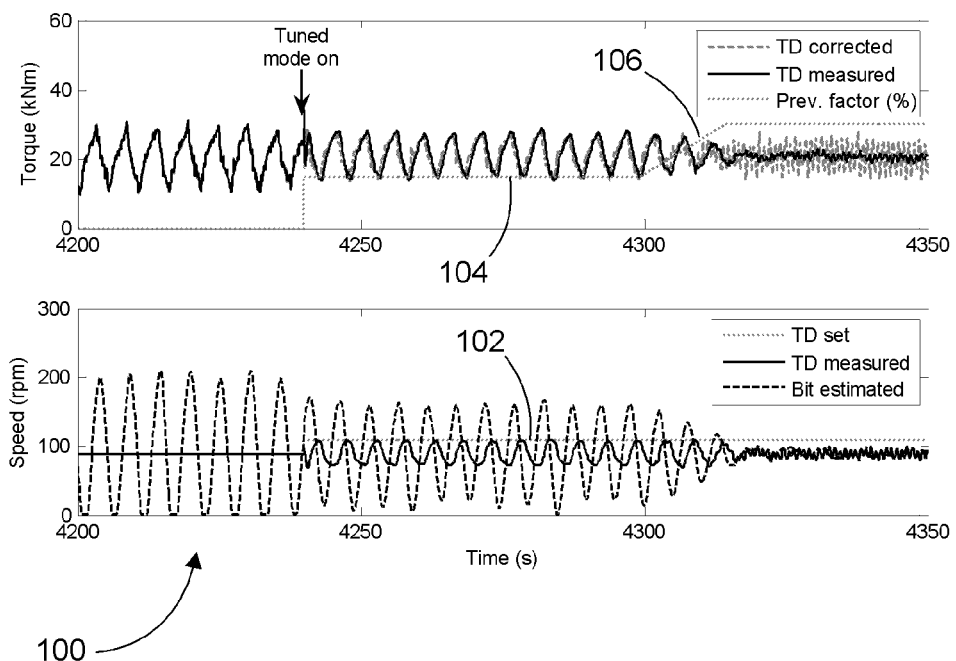

Another example of successful curing of stick-slip motion is shown in FIG. 8. In this figure a similar graph 100 to graph 90 is shown:

The "TD set" speed (trace 102) is the speed command sent to the drive. When the tuning is turned on, this level is raised so the bypassed drive speed controller always tries to increase the torque beyond the dynamic limit of the new speed controller. In this case the speed increase is a slightly too small, causing the dynamic speed to be clipped by the drive speed controller. This clipping will reduce the damping effect under the tuned PI controller.

When tuning is turned on, the mobility factor (line 104) is approximately 15%. This is a little too low, because stick-slip oscillations are not cured before the operator increases this factor at 106.

After the stick-slip motion has faded at about 4310 s, the 1.1 Hz oscillations reappear with an amplitude similar to what was observed before. But now the vibrations are seen also in the measured speed.

Additional data, not included here, show that the 1.1 Hz oscillation amplitudes decrease but do no vanish completely when the mobility factor is further increased. It means that even though the top drive impedance is inertia dominated at this frequency the soft PI controller also has some dampening effect on higher mode oscillations as well.

Higher Stick-Slip Modes

The stick-slip damping method described above works very well in a wide range of cases. However, extensive Hardware-In-the-Loop (HIL) simulation testing has revealed a further problem when the string is extremely long (typically 5000 m or more) and the measured i.e. fundamental stick-slip period exceeds about 5-8 s i.e. a frequency $\omega_s$ of about 0.2-0.13 Hz. The method is still able to damp the fundamental mode stick-slip oscillations, but as soon as these oscillations are dampened, the second natural mode tends to become unstable and grow until full stick-slip is developed at that second mode. This second mode has a natural frequency which is approximately three times higher than the fundamental stick-slip frequency $\omega_s$. The higher order stick-slip oscillations are seen as short period (less than about ⅓ of the fundamental stick-slip period) and large amplitude (greater than about 2 kNm) cyclic variations of the drive torque. We have also found via simulations that, during second mode stick-slip oscillations, the bit rotation speed varies between zero and peak speeds exceeding twice the mean speed.

Simulations have shown that the system sold under the trade mark SOFT TORQUE® also suffers from the same problem. Neither system is able to damp at the same time both the first and second mode stick-slip oscillations.

We have discovered that by reducing the effective inertia of the drilling mechanism this problem can be addressed. There are several ways that the effective inertia can be reduced including making a relatively small change in the tuned PI controller described above, and selecting a higher gear in the drilling mechanism. Advantages of reducing the effective inertia include: more effective damping of higher modes, and increased tolerance in the method to errors in the estimated stick slip frequency. There are two ways we have identified to reduce the effective inertia of the drilling mechanism: by tuning of the speed controller and by changing gear (if possible). Each will be described below.

Speed Controller Tuning to Dampen Higher Modes

For clarity, the first embodiment of the speed controller 42 described above will be referred to as the 'tuned PI controller' and the second embodiment of the speed controller 42 described below will be referred to as the 'inertia compensated PI controller'.

Before describing the optional improvement to the method, we first set out a basic description of the higher modes of torsional string oscillations. As described above (see equations (14) and (15)) the natural angular frequency for mode m of a lossless string rotated by top drive with zero mobility is given by:

$$\omega_m = \left(2m - 1 - \frac{2}{\pi}\tan^{-1}\left(\frac{\omega_m J_b}{\zeta}\right)\right)\frac{\pi c}{2l} \quad (21)$$

where m is a positive integer indicating mode number (m=1 for the lowest mode);

$J_b$ is the inertia of the bottom hole assembly (BHA);

$\zeta$ is the characteristic impedance of the drill pipes;

c is the sonic speed for torsional waves; and l is the length of the drill pipe section (excluding the BHA length).

It is convenient to introduce the normalized frequency $$\phi_m = \frac{2l}{\pi c}\omega_m \qquad (22)$$

and the normalized inertia $$j_b = \frac{\pi c}{l\zeta}J_b = \frac{J_b}{J_{dp}} \qquad (23)$$

Here we have used the fact that the characteristic impedance can be expressed as $\zeta = J_{dp}c/l$, where $J_{dp}$ represents the total inertia of the drill pipes. The frequency equation (21) can now be written as:

$$\phi_m = 2m - 1 - \frac{2}{\pi}\tan^{-1}\left(\frac{\phi_m j_b}{2}\right) \qquad (24)$$

Figure 9:
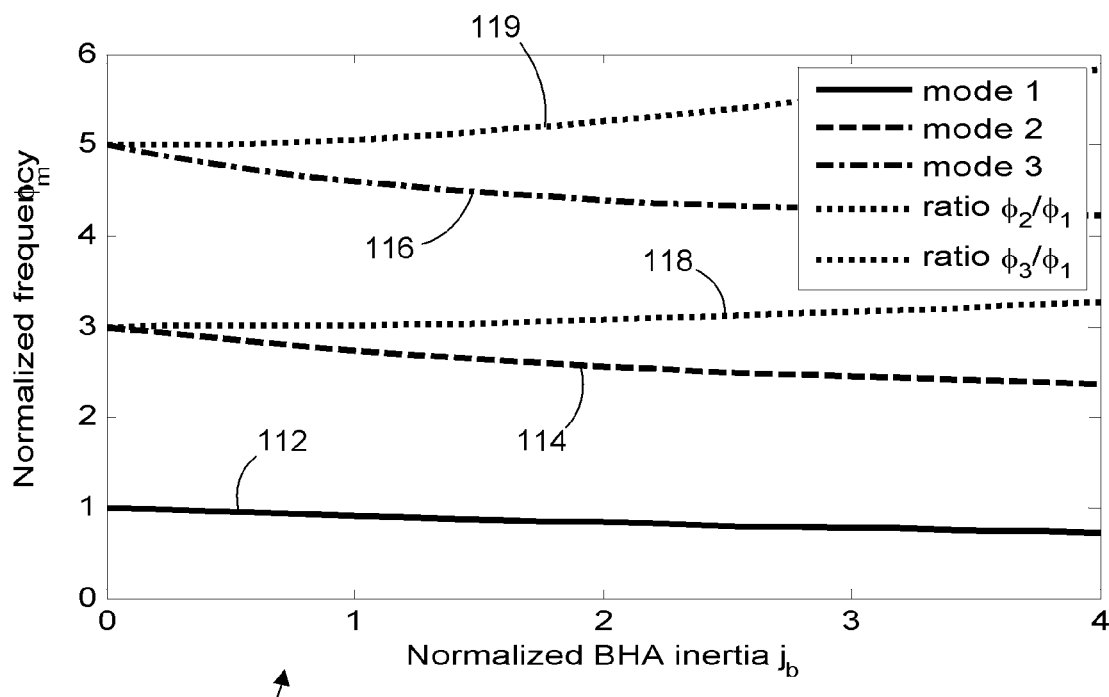
FIG. 9 is a graph of normalised frequencies versus normalized BHA inertia.

For non-zero inertia values this equation is transcendental, which means that it has no explicit analytical solutions and must be solved numerically, as described above. Referring to FIG. 9 a graph 110 shows the three lowest roots (m=1, 112; m=2, 114; m=3, 116) versus the normalized inertia $j_b$. Frequency ratio curves 118, 119 show that the ratio is nearly constant and approximately equal to 2m−1 for small BHA inertia ($j_b \leq 1$). In practice, very long drill strings (>5 km) used for extended horizontal reach, have quite small and light BHAs (without drill collars or heavy weight drill pipes) to limit the total friction torque. Therefore, the low inertia ratios 3 and 5 for the second and third modes respectively are very good approximations to reality.

The corresponding mode shapes for the dynamic rotation speed can be found from the wave numbers $k_m$, which can be written as:

$$k_m = \frac{\omega_m}{c} = \frac{\pi}{2l}\phi_m \qquad (25)$$

The corresponding eigenfunctions describing how the angular speed amplitude varies with depth, are $$\sigma_m = \sin(k_m z) = \sin\left(\frac{\pi \phi_m z}{2l}\right) \qquad (26)$$

where z is depth referred to the top drive position.

Figure 10:
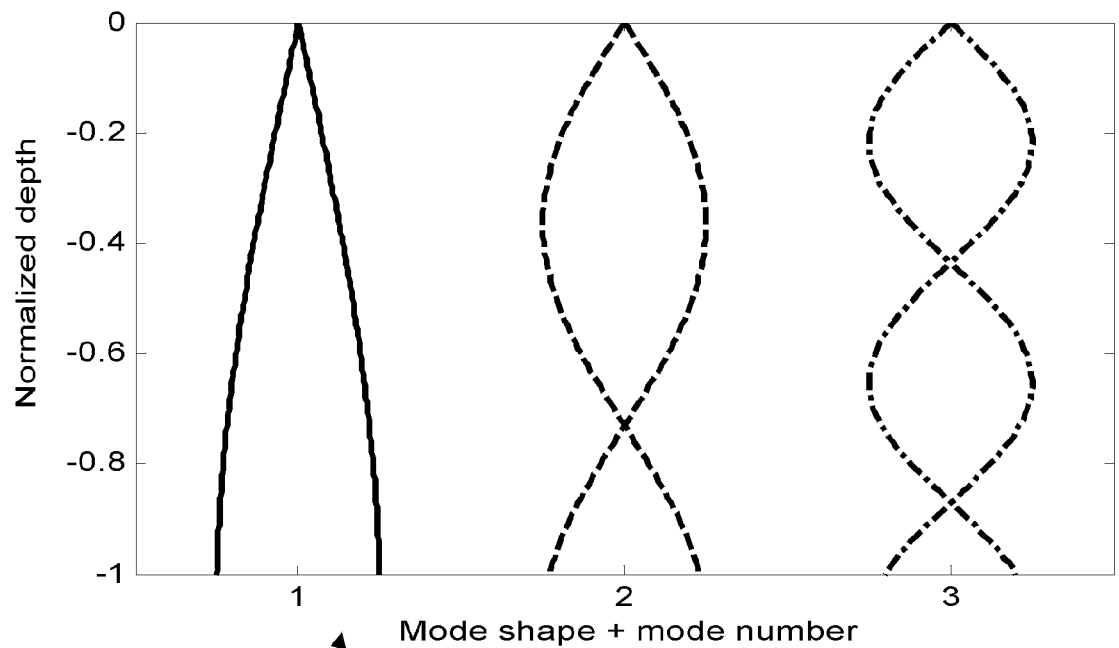
FIG. 10 is a graph illustrating the first three torsional oscillation modes of a drill string.

Referring to FIG. 10 a graph 120 shows the mode shapes $m \pm 0.256\sigma_m$ for the three lowest modes for the case when $j_b = 1$. The Y-axis represents normalized depth $z_n = -z/l$. It is apparent that the bit (lower string end where z=−1) is close to an anti-node, for all three modes.

We have discovered that the speed controller 42 can be improved to counter stick-slip of the drill bit at both the first and second modes and, to some extent, higher modes of stick-slip oscillation. The basis for the improvement is found in the equation of angular motion of the drilling mechanism 30. Referring to equation (3) above, the equation of motion for the drilling mechanism 30 can be expressed by:

$$J_d \frac{d\Omega}{dt} = T_d - T$$

where the torque $T_d$ of the drilling mechanism is given by:

$$T_d = J_c \frac{d\Omega}{dt} + P(\Omega_{set} - \Omega) + I\int (\Omega_{set} - \Omega)dt \qquad (28)$$

and where $J_d$ is the total mechanical drive inertia (including gear and drive motors);

$J_c$ is a computer or manually controllable compensation inertia;

P is the speed controller P-factor (referred to output shaft);

I is the speed controller I-factor;

$\Omega_{set}$ is the angular set speed; and $\Omega$ is the actual top drive speed as measured.

Thus the speed controller uses three terms to control the torque $T_d$ applied by the drilling mechanism 30 to the drill string. The second two terms on the right-hand side are familiar from equation (2) above.

The first term on the right-hand side of equation (28) is the key component for extending the functionality of the tuned PI controller of the first embodiment. In contrast to a normal derivative term of a PID controller, which is proportional to derivative of the speed error, the new speed controller term is proportional to the derivative of the measured speed only. The proportionality factor $J_c$ is called the compensation inertia because it has dimensions of inertia and it reduces the effective inertia of the drilling mechanism 30. This is seen by combining equations (2) and (28), and moving this derivative term over to the left hand side:

$$(J_d - J_c)\frac{d\Omega}{dt} = P(\Omega_{set} - \Omega) + I\int(\Omega_{set} - \Omega)dt - T \qquad (29)$$

This is the equation of motion for a drilling mechanism 30 with a reduced inertia using a conventional or tuned PI speed controller. The advantage of this inertia reduction is that the absorption bandwidth of the drilling mechanism 30 is increased, as explained below. Furthermore, since $J_c$ is software controllable, inertia compensation can be switched on and off readily in the speed controller and, when on, can be adjusted either in real-time if needed. Alternatively, it is possible to allow the driller to set $J_c$ manually via the driller's console for example.

Following the same methodology as described above in conjunction with equation (6) above, the effective torsional impedance can be written as the complex function:

$$Z_d = i\omega(J_d - J_c) + P + \frac{I}{i\omega} \qquad (30)$$

where $i=\sqrt{-1}$ is the imaginary unit and $\omega$ is the angular frequency. The corresponding reflection coefficient $r_d$ for the drilling mechanism 30 is $$r_d = -\frac{P - \zeta + i \cdot \left(\omega(J_d - J_c) - \frac{I}{\omega}\right)}{P + \zeta + i \cdot \left(\omega(J_d - J_c) - \frac{I}{\omega}\right)} \quad (31)$$

where $\zeta$ is the so-called characteristic impedance of the drill pipe and represents the ratio of torque and angular speed for a progressive wave propagating along the drill string 12. This complex reflection coefficient represents both amplitude and phase of the reflected wave when a unit incident torsion wave, which propagates upwards in the drill string 12, is reflected at the top. The magnitude of this reflection coefficient is strongly related to the torsional oscillations as described above in conjunction with the tuning of the speed controller 42 to dampen the fundamental stick-slip oscillation.

It is convenient to define the effective inertia as $J=J_d-J_c$ and a non-dimensional reactance $b=(\omega J-I/\omega)/P$. The mobility parameter $a=\zeta/P$ is as defined above in connection with the first embodiment. The damping, which is the amount of torsional energy absorbed by the drilling mechanism 30 (i.e. the torsional energy not reflected back down the drill string 12), then can be written as $$1 - |r_d| = 1 - \sqrt{\frac{(1-a)^2 + b^2}{(1+a)^2 + b^2}} \quad (32)$$

When $b=0$, that is when $\omega=\omega_0\equiv\sqrt{I/J}$, then the damping is at its maximum and equal to $1-|r_d|=2a/(1+a)$. It can be shown that the damping equals half this value when $b^2=(1+a)^2(2-a)/(2+a)$ and when the angular frequency is $$\omega = \sqrt{\omega_0^2 + \left(\frac{b\zeta}{2aJ}\right)^2} \pm \frac{b\zeta}{2aJ} \quad (33)$$

The frequency ratio $\omega/\omega_0$ for the highest root (+ sign) gives a quantitative measure for the absorption bandwidth $\beta$ of the drilling mechanism 30:

$$\beta = \sqrt{1 + \left(\frac{b\zeta}{2a\omega_0 J}\right)^2} + \frac{b\zeta}{2a\omega_0 J} \quad (34)$$

This formula shows that the absorption bandwidth $\beta$ is increased when the effective inertia J is reduced. Accordingly following equation (9) above, the I term of the inertia compensated PI controller is set as $I=\omega_s^2 J$ where $J=J_d-J_c$ i.e. is set as an inertia compensated value. When the I-term of speed controller 42 is set in this way, it causes the drilling mechanism 30 to have an increased absorption bandwidth on torsional vibrations compared to the tuned PI controller, since the latter is tuned primarily to dampen the fundamental stick-slip mode.

It is easily verified that the ratio between the highest and lowest roots of the frequency equation (33) equals $\beta^2$, meaning that the reflection curve is symmetric about the centre frequency when plotted with a logarithmic frequency axis.

Figure 11:
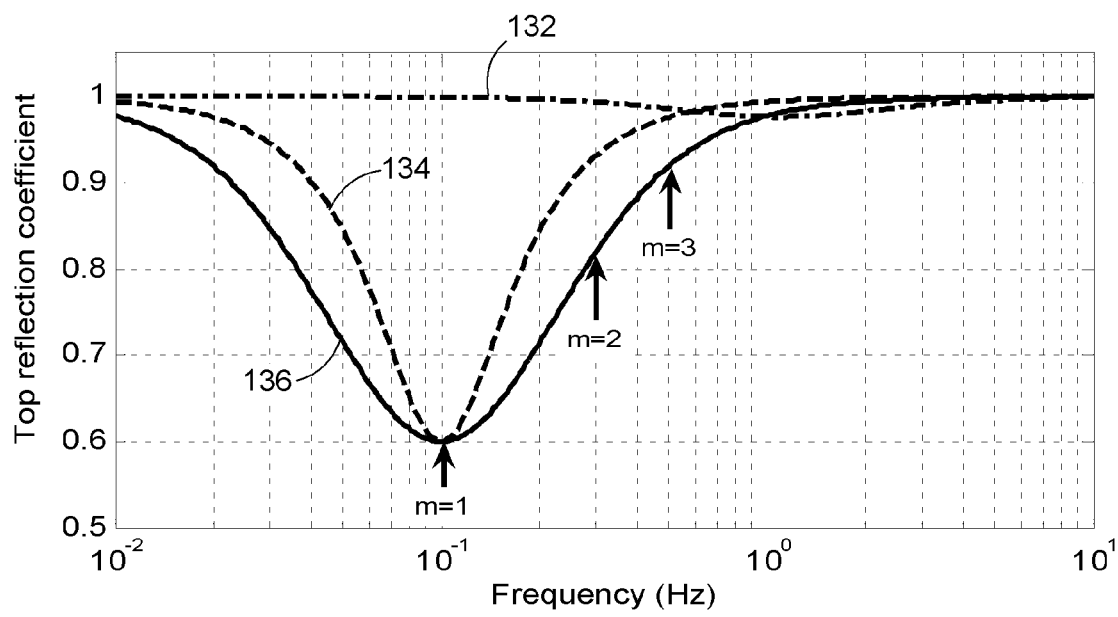
FIG. 11 is a graph of frequency versus reflection coefficient showing a comparison between a drilling mechanism using: a standard speed controller, a speed controller according to a first embodiment the present invention, and a speed controller according to a second embodiment of the present invention.

Referring to FIG. 11 a graph 130 illustrates the increase of absorption bandwidth and shows the reflection coefficient versus frequency for a standard stiff speed controller 132, a tuned PI controller 134, and an inertia compensated PI controller 136. The example assumes a 5" drill pipe (having a characteristic drill pipe impedance of $\zeta=340$ Nms), a total mechanical top drive of inertia $J_d=2000$ kgm$^2$ (i.e. the sum of the mechanical inertia due to the motor and gear), a 50% inertia compensation ($J_c=J=0.5J_d$), a mobility parameter of a=0.25, and an observed or measured fundamental (m=1) stick-slip frequency of 0.1 Hz (period=10 s). By reducing the effective inertia of the drilling mechanism 30, the absorption bandwidth is increased from $\beta=1.76$ (tuned PI controller) to $\beta=2.75$ (inertia compensated PI controller). The arrows in FIG. 11 are positioned at the natural frequencies of the respective modes. It is clearly seen that the reflection coefficient for the second mode (m=2) drops from 0.93 to 0.82 when switching from the tuned PI controller to the inertia compensated PI controller. This drop represents a large damping improvement, sufficient to inhibit, and in certain embodiments prevent, second mode stick-slip oscillations.

It is also possible, optionally, to further improve the damping of higher modes (i.e. m≥2) by shifting the minimum of reflection coefficient curve to higher frequencies. This is a kind of controlled de-tuning in which the maximum damping frequency is deliberately moved away from fundamental frequency of stick-slip oscillations as measured or observed (see section above on measurement of $\omega_s$). Once the fundamental frequency has been measured or observed, the value can be increased by between about 0% and 40%. This shifted fundamental frequency is then used to determine the I-term of the speed controller as described above. The effect of this is that the reflection coefficient curve is shifted to higher frequencies, thereby reducing the reflection coefficients of at least some of the higher modes of stick-slip oscillation. An alternative way to determine the increase in $\omega_s$ is by some power of $\beta$ between zero and one, $\beta^{1/4}$ for example. A particular advantage of this is that the damping of the fundamental mode remains near to its original value, for example a change in the reflection coefficient from 0.6 to 0.62.

However, care has to be taken to ensure that the minimum of the reflection coefficient curve is not shifted too far from the fundamental mode of the stick-slip oscillations. We suggest that the fundamental stick-slip frequency used to determine the I-term is not increased by more than a factor $\beta^{1/2}$ above the actual measured or observed frequency. In this way damping of at least some of the higher modes (e.g. m=2,3) is improved whilst sacrificing only a small amount of damping of the fundamental stick-slip mode.

A further advantage of shifting the minimum reflection point (i.e. maximum damping) to higher frequencies is that the damping of frequencies below the fundamental is increased. This means that variations in bit torque cause smaller variations in angular speed at the top of the drill string 12 making the drilling mechanism appear "stiffer" at these low frequencies, which is important for drilling efficiency.

Figure 12:
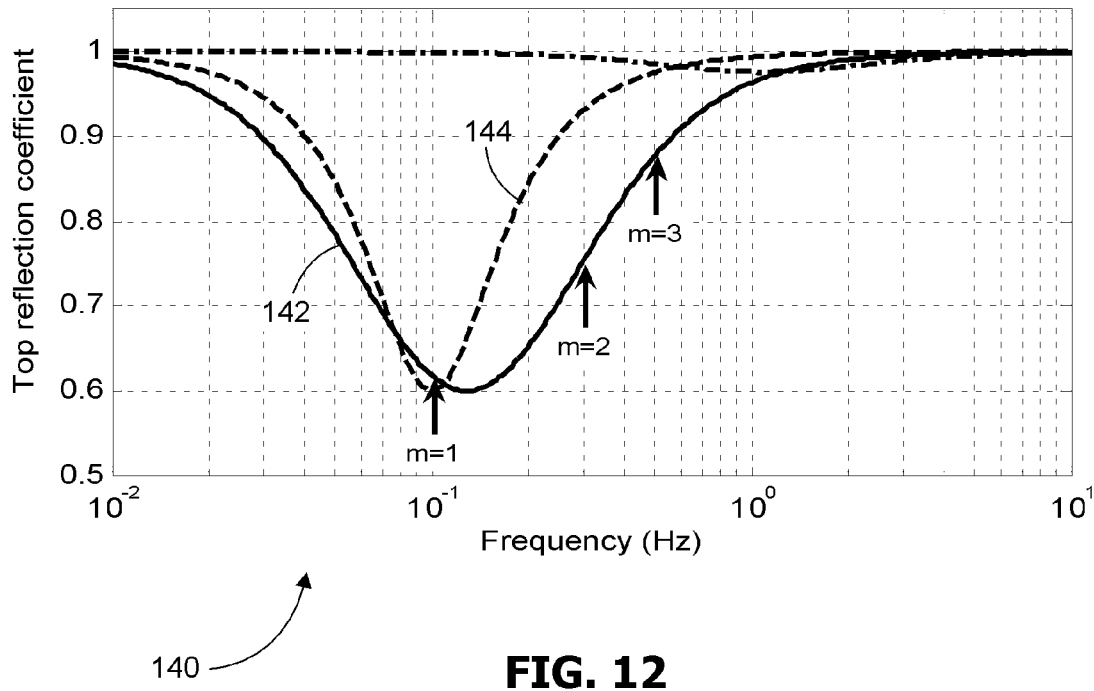
FIG. 12 is a graph of frequency versus reflection coefficient illustrating a de-tuning aspect of the second embodiment of the present invention.

Referring to FIG. 12 a graph 140 illustrates an example of such controlled de-tuning. The reflection curve 142 of an inertia compensated speed controller has been de-tuned so that the maximum damping frequency is about 22% higher than the fundamental stick-slip frequency (shown by the reflection curve 144 of a speed controller tuned primarily to dampen the fundamental frequency). In the reflection curve 142 the reflection coefficient at the fundamental frequency has increased slightly, from 0.6 to 0.62, while the second mode reflection coefficient has been significantly improved from 0.82 to 0.75.

Somewhat surprisingly we have found that using de-tuning only i.e. shifting the fundamental damping frequency but keeping inertia compensation constant, lead to a narrower absorption bandwidth with a very small shift of the high frequency part. In order to overcome this we found that combining a frequency shift with extra inertia compensation achieved both at the same time: the frequency was shifted whilst preserving the wider absorption bandwidth so that damping of one or more higher mode was improved. One way to do this is to keep the product $\omega_0 J$ constant. In the example shown in FIG. 12 the effective inertia is divided by the same factor, $\beta^{1/4}=1.22$, by which the centre frequency is increased. This choice leaves the product of $\omega_0 J$ and the bandwidth parameter $\beta$ unchanged. This kind of frequency shift implies that the inertia compensation is increased, in this particular case from $J_c=0.5J_d$ to $J_c=0.59J_d$.

Figure 13:
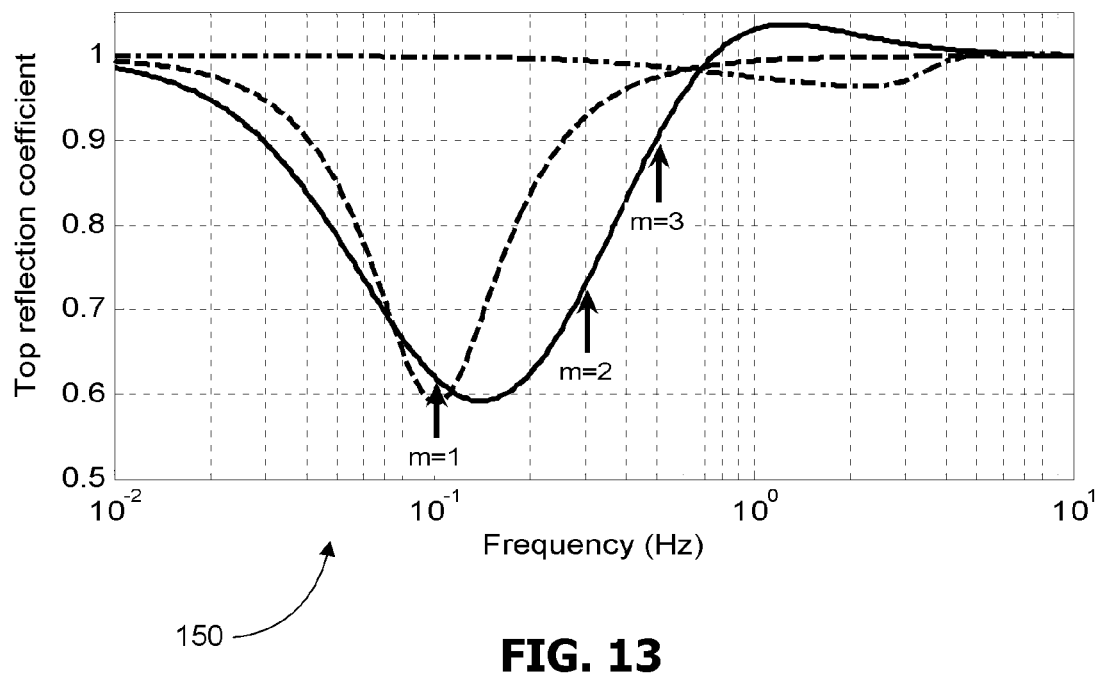
FIG. 13 shows a graph similar to FIG. 11, showing the effect of delay and a low pass filter on a speed controller according to the second embodiment.

The analysis above is based on the assumption that there is no time delay or filtering of the measured speed $\Omega$. In practice, a speed measurement will be associated with a small time delay. Furthermore, the drive acceleration needed for inertia compensation can be very noise driving unless the derivative filter is combined with a filter. Referring to FIG. 13 a graph 150 shows the effect of a 20 ms delay of the measured speed $\Omega$ and a low pass filter (time constant 50 ms) used to produce a smoothed acceleration signal. From this figure it is seen that the delay and filter affects the reflection coefficient of the inertia compensated controller so that it exceeds unity for high frequencies (>0.75 Hz). This means that frequencies have negative damping and will grow in amplitude unless the natural damping along the string exceeds the negative contribution from the drilling mechanism 30. In contrast, the delay effect on the reflection coefficients for the normal and tuned controllers is very small. So whilst the compensation inertia $J_c$ is adjustable (e.g. higher $J_c$ increased absorption bandwidth and vice-versa), care has to be taken when increasing it. In particular, as the absorption bandwidth increases, a wider range of frequencies are subjected to negative damping.

To implement the new torque term from equation (28), the PI controller requires angular acceleration as an input signal. The angular drive acceleration is normally not measured separately but derived from the speed signal by using the following difference approximation $$\frac{d\Omega}{dt} \approx \frac{\Delta\Omega}{\Delta t}$$

Here $\Delta\Omega$ is the measured speed change during the computing cycle time. This approximation introduces a delay time (equal to half the cycle time), in addition to a possible delay in the measured speed itself.

Optionally, the speed controller 42 may be configured to check the approximate fundamental stick-slip period as determined or measured, against a period threshold such as 5 s. If the fundamental period is greater than this threshold, the speed controller may reduce the effective inertia of the drilling mechanism 30 to dampen any higher mode oscillations. Furthermore the amount of damping may be proportional to the fundamental period, for example starting a 0% for a fundamental period of 5 s, increasing linearly to 75% inertia compensation for a fundamental period of 8 s. Other adjustments (e.g. non-linear) of effective inertia with measured period are envisaged.

Figure 14:
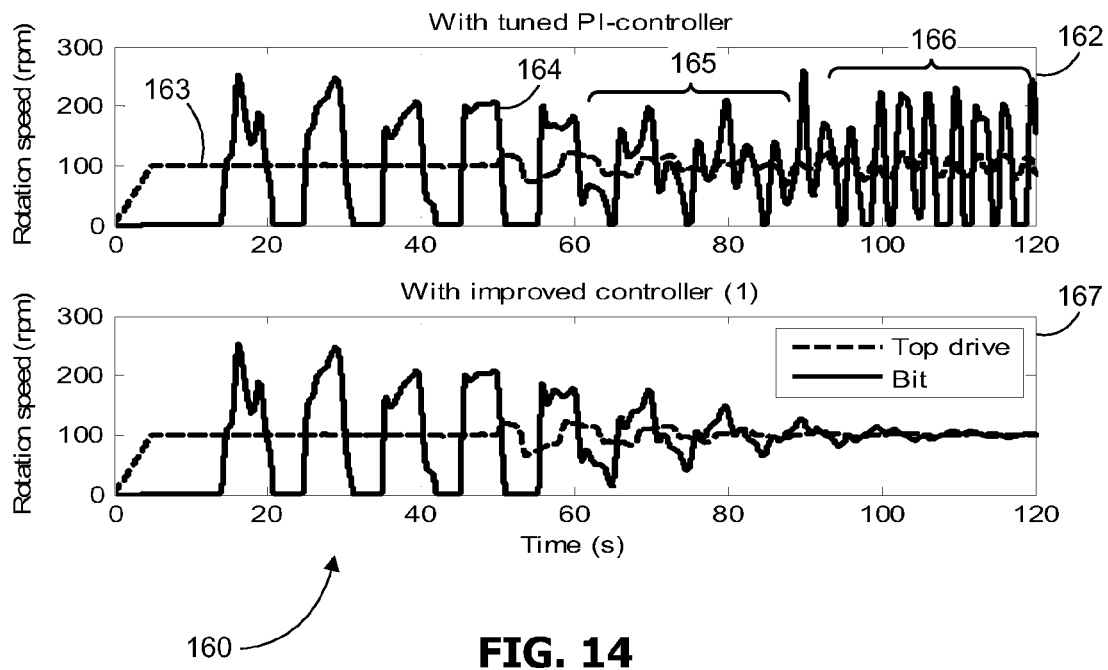
FIG. 14 are graphs illustrating results of a computer simulation modelling of a second method according to various embodiments of the present invention.

Referring to FIG. 14 a graph 160 illustrates how the inertia compensated speed controller 42 is able inhibit second mode stick slip oscillations. The upper subplot 162 shows top drive speed 163 and the bit speed 164 when a tuned PI controller is activated 50 s after start of drill string rotation. The stick-slip oscillations at the fundamental frequency are cured, but after a short transient period 165 second mode stick-slip oscillations 166 appear. Note that the second mode frequency is nearly 0.3 Hz, or three times higher than the fundamental mode frequency.

The lower subplot 167 shows the results from a similar simulation when an inertia compensated PI controller is activated after 50 s from the start. The improved speed controller has used a compensation factor of 0.5, that is $J_c=0.5J_d$, but no frequency shift (or "de-tuning") is applied. This speed controller is able to prevent stick-slip oscillations at both the fundamental and second modes, resulting in smooth drilling with only small variations of the drive torque and the bit speed.

Changing Gear to Dampen Higher Modes

If the drilling mechanism 30 has a multiple speed gear box, the gear selection also affects the absorption bandwidth and the damping of higher modes in a similar way as the tuning method above. This is deduced from discussion above and from the expression of the total mechanical drilling mechanism inertia $$J_d = J_g + n_m n_g^2 J_m \quad (35)$$

where
$J_g$ is the gear inertia (referred to output shaft);
$J_m$ is motor (rotor) inertia;
$n_m$ is the number of motors; and
$n_g$ is the gear ratio (motor speed/output speed).

Figure 15:
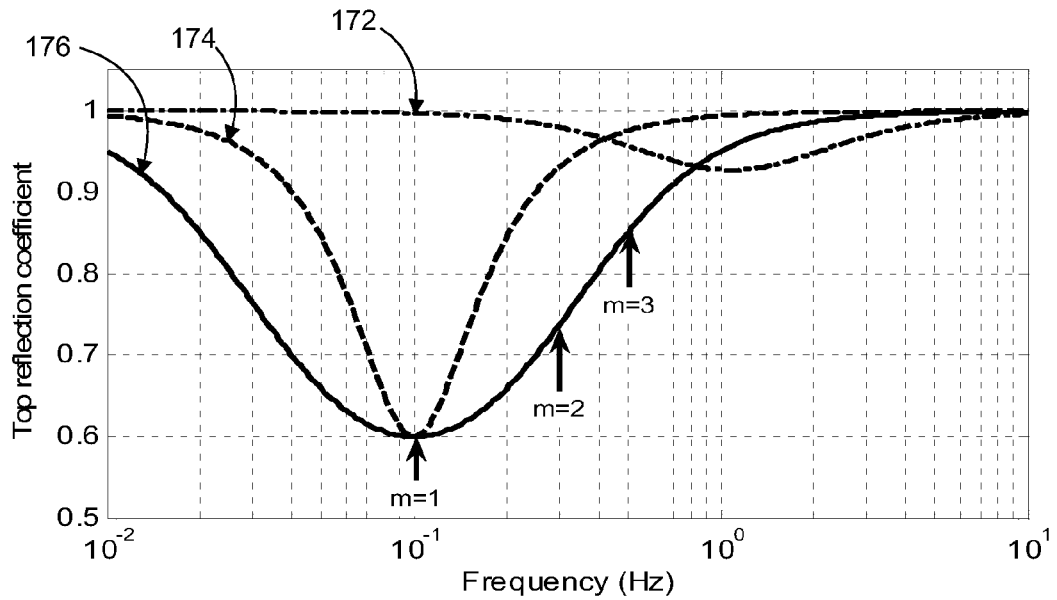
FIG. 15 is a graph of frequency versus reflection coefficient of a method of damping stick-slip oscillations according to a third embodiment of the present invention.

Switching from low gear to high gear implies that the gear ratio $n_g$ drops, typically by a factor of two. As an example, consider a single motor top drive ($n_m=1$) with a motor rotor inertia of $J_m=25$ kgm$^2$, a gear inertia of $J_g=200$ kgm$^2$ and with two gear ratios $n_{g1}=8.49$ and $n_{g2}=4.25$. The corresponding drive inertia values then becomes approximately $J_{d1}=2000$ kgm$^2$ and $J_{d2}=650$ kgm$^2$ in low and high gears, respectively. The reduction in mechanical inertia represents a pronounced increase of the absorption bandwidth as seen in FIG. 15, actually from $\beta=1.76$ (low gear) to $\beta=3.95$ (high gear). In FIG. 15 trace 172 shows the reflection coefficient versus frequency for an untuned stiff controller in high gear, trace 174 for a tuned PI controller according to the first embodiment in low gear, and trace 176 for the same tuned PI controller in high gear. The increase in absorption bandwidth at the higher gear can be seen clearly.

In practice, the possibility of selecting a high gear (i.e. with low inertia) is limited, both because many top drives do not have multiple speed gear boxes, and because the torque capacity in high gear may be too low to overcome the high friction torque in extremely long and deviated wells.

Using a PID-Type Speed Controller to Dampen Higher Modes

Another alternative is that the inertia compensation can be implemented through a digital PID-type speed controller of the type found in industrial AC drives (e.g. the ACS800 manufactured by ABB). Such drives typically have an interface which allows manual control of the P, I and D terms of the speed controller. The terms are set according to equation (28) and in particular, the P and I terms may be set as described above. However, the D term is more complicated to implement because it is proportional to the derivative of the speed of the drive, rather than to the derivative of the speed error of the drive as in normal PID control. Therefore it is believed that it is not possible to implement the new term $$J_c \frac{d\Omega}{dt}$$

via the standard D-term because this latter term will have an unwanted effect on the set speed. In particular, the D term will need to be set as a negative value in order to reduce the effective inertia. However, a standard digital PID controller can be adapted by adjustment of the speed controller firmware via the low level source code of the drive or, if that is inaccessible to the user, by requesting the manufacturer of the drive to implement this term in the firmware.

It is to be noted that the three terms in a standard PID controller are not always specified directly. Instead they are commonly specified indirectly through a so-called k-factor, which is a normalized P-factor, a time integration constant $t_i$ and a derivative time constant $t_d$. The P-factor (referred to the motor axis, has the dimensions of Nms and is related to the k-factor by $P_m = k*T_{nom}/(\pi*N_{nom}/30)$ where $T_{nom}$ (in Nm) is the nominal motor torque and $N_{nom}$ (in rpm) is the nominal motor speed (usually found on the name plate of the motor). The integration time constant is the ratio of $t_i = P/I$ while the derivation time constant is $t_d = D/P$.

In summary, there is described a PI or PID controller tuning method for inhibiting detrimental stick-slip oscillations. In a first embodiment, a speed controller is provided that enables a drilling mechanism to absorb energy from stick-slip oscillations over an absorption bandwidth that includes a fundamental frequency of those oscillations. In a second embodiment, a speed controller is provided in which the absorption bandwidth of the drilling mechanism is increased, and the energy absorption of higher mode(s) is improved over the first embodiment sufficient to inhibit both the fundamental and one or more higher mode of oscillation.

In the first embodiment, the system comprises a PI type drive speed controller being tuned so that it effectively dampens torsional oscillations at or near the stick-slip frequency. It is passive in the sense that it does not require measurement of string torque, drive torque or currents, as alternative systems do. The damping characteristics of a tuned drilling mechanism drops as the frequency moves away from the stick-slip frequency, but the damping never drops below zero, meaning that the drilling mechanism will never amplify torsional vibrations of higher modes. In the second embodiment, the system comprises a PI or PID type drive speed controller being tuned so that the drilling mechanism has a wider absorption bandwidth of oscillation frequencies which includes both a fundamental mode and at least one higher mode of stick-slip oscillations. The tuning in the second embodiment uses inertia compensation to reduce an effective inertia of the drilling mechanism as seen by the controller and thereby improve the absorption bandwidth. An alternative to tuning the PI or PID controller is to change into a higher gear on the drilling mechanism.

Embodiments of the invention are suitable for implementation in the PLC controlling a drilling mechanism. The tuned PI-controller can either be implemented in the PLC itself or, alternatively, calculate the speed controller constants P and I and pass to the inherent digital speed controller of the top drive motors. Embodiments of the invention also include other useful aspects, including a screen based user interface, automatic determination of the stick-slip frequency, estimation of instantaneous bit speed and calculation of a stick-slip severity. The latter two are based on the drill string geometry and the measured torque signal.

In conclusion, therefore, it is seen that the embodiments of the invention disclosed herein and those covered by the appended claims are well adapted to carry out the objectives and obtain the ends set forth. Certain changes can be made in the subject matter without departing from the spirit and the scope of this disclosure. It is realized that changes are possible within the scope of this disclosure and it is further intended that each element or step recited in any of the following claims is to be understood as referring to the step literally and/or to all equivalent elements or steps. The following claims are intended to cover the disclosed principles and embodiments of the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents, patent applications and scientific papers identified herein are incorporated fully herein for all purposes.

The invention claimed is:

1. A method of controlling a drilling mechanism for use in a drilling bore using an electronic controller, the method comprising:
   driving the drill string by a drilling mechanism at the upper end of the drill string;
   estimating a fundamental frequency of stick-slip oscillations suffered by the drill string;
   determining variations in a drive torque of said drilling mechanism based on said fundamental frequency;
   combining a known torsional compliance of said drill string with said variations in a drive torque;
   estimating the instantaneous rotational speed of a bottom hole assembly at the lower end of a drill string based on the combined known torsional compliance and variations in drive torque; and
   providing an output signal representing said instantaneous rotational speed.

2. A method according to claim 1, wherein said variations in drive torque are expressed only at said fundamental frequency, whereby said estimating the instantaneous rotational speed is implemented by a PLC and performed in real time.

3. A method according to claim 1, wherein said determining step comprises band pass filtering a drive torque signal with a band pass filter centered on said fundamental frequency.

4. A method according to claim 3, further comprising:
   determining a downhole speed using a total static drill string compliance and a phase parameter, and
   determining the sum of (i) a low pass filtered signal representing a speed of rotation of said drilling mechanism and (ii) said downhole speed.

5. A method according to claim 1, further comprising:
   determining an estimate of instantaneous rotational speed periodically; and
   outputting said estimate on a driller's console whereby a driller is provided with a real-time estimate of the instantaneous rotational speed of said bottom hole assembly.

6. A method according to claim 1, further comprising: determining a stick-slip severity as a ratio of dynamic downhole speed amplitude over a mean rotational speed of said drilling mechanism, which stick-slip severity is useable to provide an output signal indicating the severity of stick-slip at that point in time.

7. A method according to claim 1, further comprising:
   damping said stick-slip oscillations using said drilling mechanism; and controlling the speed of rotation of said drilling mechanism using a PI controller;
characterized by the step of
tuning said PI controller so that said drilling mechanism absorbs most torsional energy from said drill string at a frequency that is at or near a fundamental frequency of said stick-slip oscillations.

8. A method according to claim 7, wherein said stick-slip oscillations comprise torsional waves propagating along said drill string, and wherein the tuning comprises adjusting an I-term of said PI controller to be dependent on a period of said fundamental frequency of said stick slip oscillations and on an effective inertia of said drilling mechanism, whereby said drilling mechanism has a frequency dependent reflection coefficient of said torsional waves, which reflection coefficient is substantially at a minimum at or near said fundamental frequency of stick-slip oscillations.

9. A method according to claim 8, further comprising adjusting said I-term according to $I=\omega_s^2 J$ where $\omega_s$ is an estimated angular frequency of said stick-slip oscillations and J is the effective inertia of said drilling mechanism.

10. A method according to claim 8, wherein said effective inertia comprises the total mechanical inertia of said drilling mechanism at an output shaft thereof.

11. A method according to claim 7, further comprising reducing an effective inertia of said drilling mechanism, whereby a damping effect of said drilling mechanism is increased for frequencies above said fundamental frequency.

12. A method according to claim 11, wherein the reducing said effective inertia comprises tuning said PI controller with an additional torque term that is proportional to the angular acceleration of said drilling mechanism.

13. A drilling control mechanism for use in drilling a borehole, the drilling control mechanism comprising:
an electronic controller having a memory;
wherein the memory stores computer executable instructions that when executed cause said electronic controller to:
estimate the instantaneous rotational speed of a bottom hole assembly at the lower end of a drill string that, in use, is driven by said drilling mechanism at the upper end of said drill string, and which drill string is suspected of suffering stick-slip oscillations that have an estimated or observed fundamental frequency;
determine variations in a drive torque of said drilling mechanism;
combine a known torsional compliance of said drill string with said variations in a drive torque; and
provide an output signal representing said instantaneous rotational speed.

14. A drilling mechanism according to claim 13, wherein the executable instructions cause the electronic controller to express said variations in drive torque only at said fundamental frequency, and to thereby estimate the instantaneous rotational speed in real time.

15. A drilling mechanism according to claim 13, wherein the executable instructions cause the electronic controller to band pass filter a drive torque signal with a band pass filter centered on said fundamental frequency.

16. A drilling mechanism according to claim 13, wherein the executable instructions cause the electronic controller to:
determine an estimate of instantaneous rotational speed periodically; and
output said estimate on a driller's console whereby a driller is provided with a real-time estimate of the instantaneous rotational speed of said bottom hole assembly.

17. A drilling mechanism according to claim 13, wherein the executable instructions cause the electronic controller to determine a stick-slip severity as a ratio of dynamic downhole speed amplitude over a mean rotational speed of said drilling mechanism, which stick-slip severity is useable to provide an output signal indicating the severity of stick-slip at that point in time.

18. A drilling mechanism according to claim 13, wherein the executable instructions cause the electronic controller to:
damp said stick-slip oscillations using said drilling mechanism; and
control the speed of rotation of said drilling mechanism using a PI controller;
the control characterized by:
tuning said PI controller so that said drilling mechanism absorbs most torsional energy from said drill string at a frequency that is at or near a fundamental frequency of said stick-slip oscillations.

19. An electronic controller for use with a drilling control mechanism for drilling a borehole, the electronic controller comprising:
a memory; and
an optional PI controller;
wherein the memory stores computer executable instructions that when executed cause said electronic controller to:
estimate the instantaneous rotational speed of a bottom hole assembly at the lower end of a drill string that, in use, is driven by said drilling mechanism at the upper end of said drill string, and which drill string is suspected of suffering stick-slip oscillations that have an estimated or observed fundamental frequency;
determine variations in a drive torque of said drilling mechanism;
combine a known torsional compliance of said drill string with said variations in a drive torque; and
provide an output signal representing said instantaneous rotational speed.

20. A method of controlling a drilling mechanism for use on a drilling rig, the method comprising:
upgrading the drilling mechanism by uploading computer executable instructions to an electronic controller for use on said drilling rig, which electronic controller is for controlling or monitoring operation of said drilling mechanism,
wherein said computer executable instructions comprise instructions for causing the electronic controller to:
estimate the instantaneous rotational speed of a bottom hole assembly at the lower end of a drill string that, in use, is driven by said drilling mechanism at the upper end of said drill string, and which drill string is suspected of suffering stick-slip oscillations that have an estimated or observed fundamental frequency;
determine variations in a drive torque of said drilling mechanism;
combine a known torsional compliance of said drill string with said variations in a drive torque; and
provide an output signal representing said instantaneous rotational speed.

* * * * *